(12) United States Patent
Chen

(10) Patent No.: US 12,463,770 B2
(45) Date of Patent: Nov. 4, 2025

(54) TRANSMISSION METHOD AND APPARATUS

(71) Applicant: GUANGDONG OPPO MOBILE TELECOMMUNICATIONS CORP., LTD., Guangdong (CN)

(72) Inventor: Wenhong Chen, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 36 days.

(21) Appl. No.: 18/417,860

(22) Filed: Jan. 19, 2024

(65) Prior Publication Data

US 2024/0163043 A1 May 16, 2024

Related U.S. Application Data

(63) Continuation of application No. PCT/CN2021/109892, filed on Jul. 30, 2021.

(51) Int. Cl.
*H04L 5/00* (2006.01)
*H04B 7/0404* (2017.01)

(52) U.S. Cl.
CPC ......... *H04L 5/0048* (2013.01); *H04B 7/0404* (2013.01); *H04L 5/0064* (2013.01)

(58) Field of Classification Search
CPC ... H04L 5/0048; H04L 5/0023; H04L 5/0051; H04L 5/0064; H04L 5/00; H04B 7/0404; H04W 72/12
See application file for complete search history.

(56) References Cited

U.S. PATENT DOCUMENTS

| | | | |
|---|---|---|---|
| 2019/0260527 A1* | 8/2019 | Wu | H04L 5/0051 |
| 2021/0083824 A1 | 3/2021 | Wernersson | |
| 2021/0083825 A1* | 3/2021 | Choi | H04L 5/0023 |
| 2021/0112498 A1 | 4/2021 | Weimin | |
| 2022/0140973 A1* | 5/2022 | Qin | H04L 5/0051 |
| | | | 370/336 |

(Continued)

FOREIGN PATENT DOCUMENTS

| | | |
|---|---|---|
| CN | 110572193 A | 12/2019 |
| CN | 111867078 A | 10/2020 |
| CN | 110572193 B | 1/2021 |

(Continued)

OTHER PUBLICATIONS

International Search Report in the international application No. PCT/CN2021/109892, mailed on Dec. 23, 2021. 5 pages with English translation.

(Continued)

*Primary Examiner* — Khanh C Tran
(74) *Attorney, Agent, or Firm* — Ladas & Parry LLP

(57) ABSTRACT

Provided in the embodiments of the present application are a transmission method and apparatus. The method includes: resource configuration information of a first sounding reference signal (SRS), which is from a network device, is received; and according to the resource configuration information, antenna ports of a first SRS resource on at least two orthogonal frequency division multiplexing (OFDM) symbols are transmitted. The antenna ports, which are transmitted on the OFDM symbols, are different from each other.

20 Claims, 28 Drawing Sheets

(56) References Cited

U.S. PATENT DOCUMENTS

2025/0071743 A1\* 2/2025 Liu .................. H04W 72/0453

FOREIGN PATENT DOCUMENTS

| WO | 2019197526 A1 | 10/2019 |
| WO | 2021072160 A1 | 4/2021 |
| WO | 2021109404 A1 | 6/2021 |

OTHER PUBLICATIONS

Written Opinion of the International Search Authority in the international application No. PCT/CN2021/109892, mailed on Dec. 23, 2021. 10 pages with English translation.

\* cited by examiner

| First information | 00 | 01 | 10 |
|---|---|---|---|
| Number of OFDM symbols | 1 | 2 | 4 |

FIG. 4

| First information | 0 | 1 |
|---|---|---|
| Number of OFDM symbols | 1 | 2 |

FIG. 5

Second information

| Cyclic shift value | Less than half of the total cyclic shift number | Greater than or equal half of the total cyclic shift number |
|---|---|---|
| Number of OFDM symbols | 1 | 2 |

FIG. 6

Second information

| Comb index | Less than half of the comb number | Greater than or equal half of the comb number |
|---|---|---|
| Number of OFDM symbols | 1 | 2 |

FIG. 7

TRANSMISSION METHOD AND APPARATUS

CROSS-REFERENCE TO RELATED APPLICATION

The present disclosure is a US continuation application of International Application No. PCT/CN2021/109892 filed on Jul. 30, 2021. The disclosure of the above application is hereby incorporated by reference in its entirety.

BACKGROUND

Sounding Reference Signal (SRS) is an important reference signal in New Radio (NR) system, which is widely used in various functions of the NR system.

At present, the network can configure one or more SRS resource sets to a terminal device, and each SRS resource set can contain one or more SRS resources. Each SRS resource can at most support the transmission of four antenna ports. In the prior art, when transmitting the SRS, one SRS resource can occupy multiple Orthogonal Frequency Division Multiplexing (OFDM) symbols, and the terminal device transmits all antenna ports of the SRS resource on each OFDM symbol, thereby performing frequency hopping or repetition transmission (repetition) on the multiple OFDM symbols.

However, when the number of antenna ports of the SRS is great, all N antenna ports of the SRS are transmitted on each OFDM symbol, which will cause that each antenna port uses only 1/N of the transmission power, thereby affecting the coverage range of the SRS, and then causing the degradation of channel estimation accuracy and affecting the performance of uplink and downlink transmissions.

SUMMARY

The present disclosure relates to communication technology, in particular to a method and an apparatus for transmission.

The embodiments of the present disclosure provide a method and an apparatus for transmission to avoid the degradation of channel estimation accuracy and the influence on the performance of uplink and downlink transmissions.

In a first aspect, the embodiments of the present disclosure provide a method for transmission. The method includes the following operations.

Resource configuration information of a first Sounding Reference Signal (SRS) from a network device is received.

Antenna ports of the first SRS resource are transmitted on at least two Orthogonal Frequency Division Multiplexing (OFDM) symbols according to the resource configuration information. Antenna ports transmitted on each of the OFDM symbols are different.

In a second aspect, the embodiments of the present disclosure provide a method for transmission. The method includes the following operations.

Resource configuration information of the first SRS is transmitted to a terminal device.

Antenna ports of the first SRS resource transmitted on at least two OFDM symbols by the terminal device are received according to the resource configuration information. Antenna ports transmitted on each of the OFDM symbols are different.

In a third aspect, the embodiments of the present disclosure provide an apparatus for transmission. The apparatus includes a receiving module and a transmission module.

The receiving module is configured to receive resource configuration information of a first SRS from a network device.

The transmission module is configured to transmit, according to the resource configuration information, antenna ports of the first SRS resource on at least two OFDM symbols. Antenna ports transmitted on each of the OFDM symbols are different.

In a fourth aspect, the embodiments of the present disclosure provide a apparatus for transmission. The apparatus includes a transmitting module and a receiving module.

The transmitting module is configured to transmit resource configuration information of a first SRS to a terminal device.

The receiving module is configured to receive antenna ports of the first SRS resource transmitted on at least two OFDM symbols by the terminal device according to the resource configuration information. Antenna ports transmitted on each of the OFDM symbols are different.

In a fifth aspect, the embodiments of the present disclosure provide a terminal device. The terminal device includes a transceiver, a processor and a memory.

The memory stores instructions executed by a computer.

The processor executes the instructions stored in the memory to cause the processor to execute a method for transmission as described in the first aspect above.

In a sixth aspect, the embodiments of the present disclosure provide a network device. The network device includes a transceiver, a processor, a memory.

The memory stores instructions executed by a computer.

The processor executes the instructions stored in the memory to cause the processor to execute a method for transmission as described in the second aspect above.

In a seventh aspect, the embodiments of the present disclosure provide a computer-readable storage medium, the computer-readable storage medium stores instructions executed by a computer, and a method for transmission as described in the first aspect above or the second aspect above is implemented when the instructions executed by the computer are executed by a processor.

In an eighth aspect, the embodiments of the present disclosure provide a computer program product including computer programs. When the computer programs are executed by a processor, a method for transmission as described in the first aspect above or the second aspect above is implemented.

BRIEF DESCRIPTION OF THE DRAWINGS

FIG. 4 is the first schematic diagram for an implementation of the first information indicating the number of OFDM symbols provided by the embodiments of the present disclosure.

FIG. 5 is the second schematic diagram for an implementation of the first information indicating the number of OFDM symbols provided by the embodiments of the present disclosure.

FIG. 6 is a schematic diagram for an implementation of the second information indicating the cyclic shift value of the SRS provided by the embodiments of the present disclosure.

FIG. 7 is a schematic diagram for an implementation of the second information indicating the comb index of the SRS provided by the embodiments of the present disclosure.

DETAILED DESCRIPTION

Figure 1A:
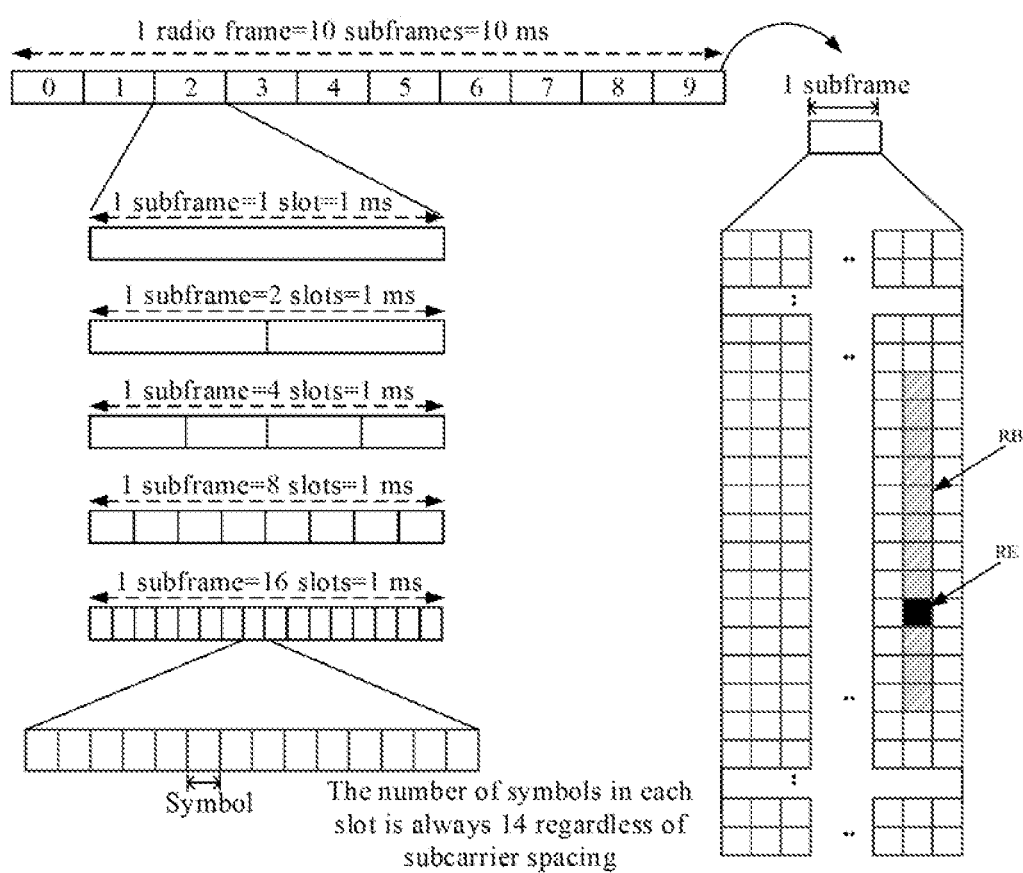
FIG. 1A is a schematic diagram of resources provided by the embodiments of the present disclosure.

The embodiments of the present disclosure provide a method and an apparatus for transmission. The method includes the following operations. Resource configuration information of a first SRS from a network device is received. Antenna ports for the first SRS resource are transmitted on at least two Orthogonal Frequency Division Multiplexing (OFDM) symbols according to the resource configuration information. Antenna ports transmitted on each of the OFDM symbols are different. The number of antenna ports transmitted in each OFDM symbol can be reduced by dispersing different antenna ports for an SRS resource to different OFDM symbols for transmission, so that the transmission power of each antenna port can be improved, the coverage range of SRS transmission can be improved, and the performance of channel estimation can be effectively improved.

In order to better understand the technical solutions of the present disclosure, in the following, the related concepts and related technologies involved in the present disclosure are introduced.

The terminal device may be a device that has a wireless transceiver function and can cooperate with the network device to provide communication services for users. Specifically, the terminal device may refer to a User Equipment (UE), an access terminal, a subscriber unit, a subscriber station, a mobile station, a mobile stage, a remote station, a remote terminal, a mobile device, a user terminal, a terminal, a wireless communication device, a user agent, or a user device. For example, the terminal device may be a cellular phone, a cordless phone, a Session Initiation Protocol (SIP) phone, a Wireless Local Loop (WLL) station, a Personal Digital Assistant (PDA), a handheld device having a wireless communication function, a computing device or other processing device connected to a wireless modem, a vehicle-mounted device, a wearable device, a terminal device in a future 5G network or a network after 5G, and the like.

The network device may be a device for communicating with the terminal device, for example, a Base Transceiver Station (BTS) in a Global System for Mobile Communications (GSM) or Code Division Multiple Access (CDMA) communication system, a NodeB (NB) in a Wideband Code Division Multiple Access (WCDMA) system, an Evolutional Node B (eNB or eNodeB) in an LTE system, or the network device may be a relay station, an access point, or a vehicle-mounted device, a Wearable device, a network side device in a future 5G network or a network after 5G, or a network device in future evolved Public Land Mobile Network (PLMN) networks, etc.

The network device referred to in embodiments of the present disclosure may also be referred to as a Radio Access Network (RAN) device. The RAN device is connected with the terminal device to receive the data of the terminal device and transmit the data to the core network device. The RAN device corresponds to different devices in different communication systems. For example, the RAN device corresponds to a base station and a base station controller in a 2G system, corresponds to a base station and a Radio Network Controller (RNC) in a 3G system, corresponds to an Evolutional Node B (eNB) in a 4G system, and corresponds to an access network device (e.g. gNB, centralized unit (CU), distributed unit (DU)) in a 5G system such as New Radio (NR) in a 5G system.

The related contents of a Resource Element (RE) are described below in combination with FIG. 1A. FIG. 1A is a schematic diagram of resources provided by the embodiments of the present disclosure.

Referring to FIG. 1A, the frame transmission period is 10 ms, and it is divided into 10 subframes, each subframe period is 1 ms, and each frame is divided into two congruent half-frames. Half-frame 0 contains five subframes 0-4, and Half-frame 1 contains five subframes 5-9.

For different subcarrier spacings, the number of slots included in the corresponding subframe is also different. For example, referring to FIG. 1A, for subcarrier spacing=15 Khz (normal CP), only one slot is included in one subframe, and for subcarrier spacing=30 Khz (normal CP), two slots are included in one subframe, for subcarrier spacing=60 Khz (normal CP), 4 slots are included in one subframe, for subcarrier spacing=120 Khz (normal CP), 8 slots are included in one subframe, and for subcarrier spacing=240 Khz (normal CP), 16 slots are included in one subframe.

In 5G/NR, multiple numerologies (waveform configuration like subframe spacing) are supported, and the radio frame structure varies slightly according to the types of numerologies. However, the number of symbols in a slot does not change with the numerology, but changes only with slot configuration type. For slot configuration 0, the number of symbols in the slot is always 14 (the case shown in FIG. 1A). For slot configuration 1, the number of symbols in the slot is always 7.

The Resource Block (RB) and the RE can also be understood with reference to FIG. 1A. 12 consecutive subcarriers in the frequency domain are referred to as a RB, which can be seen in the RB illustrated in FIG. 1A, and an element configured with in unique antenna port p and sub-carrier spacing in the resource lattice is referred to as a RE, which can be seen in the RE illustrated in FIG. 1A.

In the following, a scenario to which the method for transmission in the present disclosure applies will be described with reference to FIG. 1B.

Figure 1B:
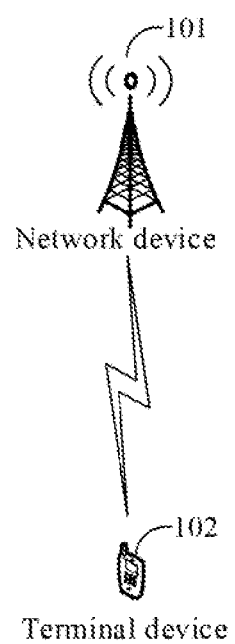
FIG. 1B is a schematic diagram of a communication scenario provided by the embodiments of the present disclosure.

FIG. 1B is a schematic diagram of a communication scenario provided by the embodiments of the present disclosure. Referring to FIG. 1B, the communication scenario includes a network device 101 and a terminal device 102, and wireless communication may be performed between the network device 101 and the terminal device 102. The terminal device 102 may communicate with at least one core network via a Radio Access Network (RAN).

The communication system may be a Global System of Mobile communication (GSM) system, a Code Division Multiple Access (CDMA) system, a Wideband Code Division Multiple Access (WCDMA) system, a Long Term Evolution (LTE) system or a 5th-Generation (5G) system.

Accordingly, the network device may be a BTS in a GSM system or a CDMA system, a NodeB (NB) in a WCDMA system, an evolved NodeB (eNB), an access point (AP) or a relay station in an LTE system, or a base station in a 5G system, etc., which are not limited herein.

The 5G mobile communication system in the present disclosure includes a non-standalone (NSA) 5G mobile communication system and/or a standalone (SA) 5G mobile communication system. The technical solutions provided by the present disclosure may also be applied to future communication systems, such as the sixth generation mobile communication system. The communication system may also be a PLMN network, a device-to-device (D2D) network, a machine to machine (M2M) network, an IoT network, or another network.

It can be understood that if the technical solutions of the embodiments of the present disclosure are applied to other wireless communication network, the corresponding names may also be replaced by the names of corresponding functions in other wireless communication network.

The network architecture and service scenario described in the embodiments of the present disclosure are intended to more clearly explain the technical solutions of the embodiments of the present disclosure and do not constitute a limitation to the technical solutions provided by the embodiments of the present disclosure. Ordinary technical personnel in the field can see that with the evolution of the network architecture and the emergence of new service scenarios, the technical solutions provided by the embodiments of the present disclosure are equally applicable to similar technical problems.

On the basis of the above introduction, the following is a brief introduction to SRS.

The SRS is an important reference signal in the 5G/NR system, which is widely used in various functions in NR system, for example, it may be applied to the following aspects:

1. used for acquiring downlink channel state information (UE sounding procedure for DL CSI acquisition)
2. used for uplink beam management
3. used for positioning function
4. cooperate with codebook-based uplink transmission (including frequency domain scheduling and Rank/precoding matrix indicator (PMI)/Modulation Coding Scheme (MCS) determination)
5. cooperate with Non-Codebook-based uplink transmission (including frequency domain scheduling and Sounding Reference Signal Resource Indicator (SRI)/MCS determination)

In the implementation process, the network device may configure one or more SRS resource sets to a UE, wherein each SRS resource set may configure one or more SRS resources. Each SRS resource supports the transmission of at most four antenna ports.

The transmission of the SRS may be periodic, semi-persistent and aperiodic, which are described below respectively.

Firstly, periodic SRS and semi-persistent SRS are introduced in the following.

The periodic SRS refers to the SRS transmitted periodically, and its period and slot offset are configured by a Radio Resource Control (RRC) signaling. Once the terminal device receives the corresponding configuration parameters, it transmits the SRS according to a certain period until the RRC configuration fails. Spatial relation information (transmission beam) of the periodic SRS is also configured by the RRC signaling. The spatial relation information may indicate a Channel State Information Reference Signal (CSI-RS), a Synchronization Signal and a Physical Broadcast Channel (SSB) or a reference SRS. The terminal device determines a transmission beam of the target SRS resource according to the reception beam of the indicated CSI-RS/SSB, or determines a transmission beam of the target SRS resource according to the transmission beam of the reference SRS resource.

The semi-persistent SRS is also a SRS transmitted periodically, and the period and slot offset are configured by the RRC signaling, but its activation and deactivation signaling are carried by a Media Access Control Control Element (MAC CE). After receiving the activation signaling, the terminal device starts periodically transmitting the SRS until receiving the deactivation signaling. Spatial relation information (transmission beam) of the semi-persistent SRS is carried together by the MAC CE that activates the SRS.

After receiving the period and slot offset of the RRC configuration, the terminal device may determine the slot that can be used for transmitting the SRS, for example, according to the following formula 1:

$$(N_{slot}^{flame,\mu}n_f+n_{s,f}^{\mu}-T_{offset}) \bmod T_{SRS}=0 \quad \text{(Formula 1)}$$

$T_{SRS}$ and $T_{offset}$ refer to the configured period and offset, and $n_f$ and $n_{s,f}^{\mu}$ refer to the radio frame and slot number respectively, and $N_{slot}^{frame,\mu}$ refers to the number of slots contained in each frame.

Secondly, the aperiodic SRS transmission is introduced in the following.

The aperiodic SRS transmission is introduced in the NR system. The network device may trigger the SRS transmission of the terminal device through Downlink Control Information (DCI) of the downlink or the uplink. The trigger signaling used for triggering aperiodic SRS transmission may be carried by DCI used for scheduling Physical Uplink Shared Channel (PUSCH)/Physical Downlink Shared Channel (PDSCH) in specific search space of the UE or by DCI format 2_3 in a common search space. The DCI format 2_3 may be used not only to trigger aperiodic SRS transmission, but also to configure valid Transmit Power Control (TPC) commands of the SRS on a group of UEs or a group of carriers.

In one possible implementation, the SRS trigger signaling may be referred to the Table 1 below:

| Value of SRS request field | Triggered aperiodic SRS resource set(s) for DCI format 0_1, 1_0, and 2_3 configured with higher layer parameter srs-TPC-PDCCH-Group set to 'typeB' |
|---|---|
| 00 | No aperiodic SRS resource set triggered |
| 01 | SRS resource set(s) configured with higher layer parameter aperiodicSRS-ResourceTrigger set to 1 |
| 10 | SRS resource set(s) configured with higher layer parameter aperiodicSRS-ResourceTrigger set to 2 |
| 11 | SRS resource set(s) configured with higher layer parameter aperiodicSRS-ResourceTrigger set to 3 |

After receiving aperiodic SRS trigger signaling (e.g. DCI), the terminal device performs SRS transmission on the SRS resource set indicated by the trigger signaling.

The slot offset between trigger signaling and SRS transmission is configured by high layer signaling (RRC). The network side indicates the configuration parameters of each SRS resource set of the terminal device in advance through the high layer signaling. The configuration parameters include time-frequency resource, sequence parameter, power control parameter, etc.

In addition, for each SRS resource in the triggered SRS resource set, the terminal device may also determine a transmission beam used for transmitting the SRS on the resource through the spatial relation information of the resource, and the information is configured to each SRS resource through the RRC.

For the slot offset, if the UE receives DCI signaling triggering aperiodic SRS in slot n, the UE will transmit a SRS resource in the corresponding set in the slot $$\left\lfloor n \cdot \frac{2^{\mu_{SRS}}}{2^{\mu_{PDCCH}}} \right\rfloor + k.$$

k is RRC parameter slotOffset configured for each SRS resource set, and $\mu_{SRS}$ and $\mu_{PDCCH}$ are subcarrier spacing configurations carrying trigger commands and triggering the SRS and the PDCCH, respectively.

Figure 2:
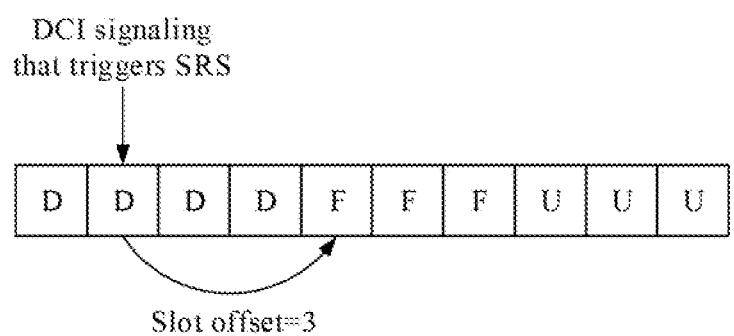
FIG. 2 is a schematic diagram of a slot for transmitting the SRS provided by the embodiments of the present disclosure.

For example, it may be understood in combination with FIG. 2, and FIG. 2 is a schematic diagram of a slot for transmitting the SRS provided by the embodiments of the present disclosure.

As illustrated in FIG. 2, there are 10 slots in FIG. 2, the first four slots are downlink slots, the fifth slot, the sixth slot and the seventh slot are flexible slots, and the last three slots are uplink slots. It is assumed that the terminal device currently receives a DCI signaling triggering aperiodic SRS in the second slot and it is assumed that the slot offset is 3, the terminal device then for example, may transmit the SRS resource in the corresponding set in the fifth slot.

On the basis of the above introduction, the following is an introduction to multi-symbol SRS transmission:

In the NR, an SRS resource may be transmitted on multiple OFDM symbols, for example, the SRS resource may be transmitted on the last T OFDM symbols in the slot. The terminal device transmits all antenna ports on each symbol, but the resources used for different OFDM symbols may be different.

The SRS on different symbols may have different transmission modes, that is, multiple OFDM symbols may have different uses. For example, when the network side needs a detection signal of the wideband, the terminal may be configured to perform frequency hopping on multiple OFDM symbols. If the current SRS is used for reception beam selection, the terminal device may transmit the SRS using the same transmission beam on multiple OFDM symbols, and the network side may receive using different reception beams on different symbols, thereby determining the best reception beam.

On the basis of the above introduction, the relevant implementation mode of the SRS frequency domain configuration is introduced below.

The frequency domain configuration of the SRS is determined by the parameters $C_{SRS}$ and $B_{SRS}$ in 38.211-Table 6.4.1.4.3-1, and the parameters $C_{SRS}$ and $B_{SRS}$ are configured by a RRC signaling. $m_{SRS,b}$ is the number of PRBs of the SRS transmission, and $b=B_{SRS}$. The SRS transmission uses a comb structure, that is, the used subcarriers are discontinuously distributed in frequency domain. The number of subcarriers (comb number), that differ between adjacent SRS subcarriers, may be W=2 or 4. The comb value (comb index, i.e. the initial subcarrier index) of each SRS resource may be an arbitrary value from 0 to N−1 and be configured by the network device to the terminal device.

For example, it may be understood in combination with Table 2 below.

TABLE 2

| $C_{SRS}$ | $B_{SRS}=0$ | | $B_{SRS}=1$ | | $B_{SRS}=2$ | | $B_{SRS}=3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 4 | 1 | 4 | 1 | 4 | 1 | 4 | 1 |
| 1 | 8 | 1 | 4 | 2 | 4 | 1 | 4 | 1 |
| 2 | 12 | 1 | 4 | 3 | 4 | 1 | 4 | 1 |
| 3 | 16 | 1 | 4 | 4 | 4 | 1 | 4 | 1 |
| 4 | 16 | 1 | 8 | 2 | 4 | 2 | 4 | 1 |
| 5 | 20 | 1 | 4 | 5 | 4 | 1 | 4 | 1 |
| 6 | 24 | 1 | 4 | 6 | 4 | 1 | 4 | 1 |
| 7 | 24 | 1 | 12 | 2 | 4 | 3 | 4 | 1 |
| 8 | 28 | 1 | 4 | 7 | 4 | 1 | 4 | 1 |
| 9 | 32 | 1 | 16 | 2 | 8 | 2 | 4 | 2 |
| 10 | 36 | 1 | 12 | 3 | 4 | 3 | 4 | 1 |
| ... | | | | | | | | |

The parameters $C_{SRS}$ and $B_{SRS}$ together determine the size of SRS bandwidth and how many parts it is divided in frequency domain. As illustrated in Table 2 above, taking $C_{SRS}=2$ as an example, see Table 2, it is assumed that $B_{SRS}=0$, then the bandwidth of each SRS is 12RB, and the frequency domain is only divided as 1 ($N_0=1$) part. It is assumed that $B_{SRS}=1$, then the bandwidth of each SRS is 4RB, the frequency domain is divided as 1 ($N_0 \times N_1=3$) part. It is assumed that $B_{SRS}=2$, then the bandwidth of each SRS is 4RB, the frequency domain is divided as 1 ($N_0 \times N_1 \times N_2=3$) part. It is assumed that $B_{SRS}=3$, then the bandwidth of each SRS is 4RB, the frequency domain is divided as 1 ($N_0 \times N_1 \times N_2 \times N_3=3$) part.

The NR system supports frequency hopping of SRS, and if $b_{hop} < G B_{SRS}$ ($b_{hop}$ is RRC configuration parameter) is met, the terminal device transmits the SRS signal in the form of frequency hopping. $m_{SRS,0}$ is the total bandwidth of SRS frequency hopping and $m_{SRS,b}$ is the number of PRBs transmitted in each time of frequency hopping. The terminal device may determine the frequency domain position of each time of frequency hopping according to the following formula 2, for example:

$$n_b = \begin{cases} \lfloor 4n_{RRC}/m_{SRS,b} \rfloor \bmod N_b & b \leq b_{hop} \\ \{F_b(n_{SRS}) + \lfloor 4n_{RRC}/m_{SRS,b} \rfloor\} \bmod N_b & \text{otherwise} \end{cases} \quad \text{(Formula 2)}$$

$N_b$ is determined by 38.211-Table 6.4.1.4.3-1, and $n_{RRC}$ is the RRC configuration parameter. $F_b(n_{SRS})$ is determined by the following formula 3:

$$F_b(n_{SRS}) = \begin{cases} (N_b/2) \left\lfloor \frac{n_{SRS} \bmod \prod_{b'=b_{hop}}^{b} N_{b'}}{\prod_{b'=b_{hop}}^{b-1} N_{b'}} \right\rfloor + \left\lfloor \frac{n_{SRS} \bmod \prod_{b'=b_{hop}}^{b} N_{b'}}{2 \prod_{b'=b_{hop}}^{b-1} N_{b'}} \right\rfloor & \text{if } N_b \text{ even} \\ \lfloor N_b/2 \rfloor \lfloor n_{SRS} / \prod_{b'=b_{hop}}^{b-1} N_{b'} \rfloor & \text{if } N_b \text{ odd} \end{cases} \quad \text{(Formula 3)}$$

The even represents even number and odd represents odd number. Regardless of the value of the parameter $N_b$, $N_{b_{hop}}=1$. The parameter $n_{RRC}$ represents the times of SRS frequency hopping. For the aperiodic SRS, the times of SRS frequency hopping is determined by the following formula 4:

$$n_{SRS} = \lfloor l'/R \rfloor \quad \text{(Formula 4)}$$

Herein, $l' \in \{0,1,\ldots, N_{symb}^{SRS}-1\}$, $N_{symb}^{SRS}$ is the number of consecutive OFDM symbols (RRC configuration parameters) and R is repetition factor (configured by RRC), which indicates the number of repeated OFDM symbols without frequency hopping. For example, when R=1, frequency hopping is performed in units of one OFDM symbol, and when R=2, frequency hopping is performed in units of two OFDM symbols.

For periodic and half-periodic SRS, the times of SRS frequency hopping is determined by the following formula 5:

$$n_{SRS} = \left( \frac{(N_{slot}^{frame,\mu} n_f + n_{s,f}^{\mu} - T_{offset})}{T_{SRS}} \right) \times \left( \frac{N_{symb}^{SRS}}{R} \right) + \lfloor \frac{l'}{R} \rfloor \quad \text{(Formula 5)}$$

$T_{SRS}$ and $T_{offset}$ are the configured period and offset, $n_f$ and $n_{s,f}^{\mu}$ are the radio frame and slot number, respectively, and $N_{slot}^{frame,\mu}$ is the number of slots contained in each frame.

The above introduces the relevant implementation mode of the SRS frequency domain configuration, on the basis of the above content, the relevant implementation mode of the uplink power control is introduced below.

At present, the transmission power of the SRS may be calculated by the following formula 6:

$$P_{SRS,b,f,c}(i, q_s, l) = \min \begin{Bmatrix} P_{CMAX,f,c}(i), \\ P_{O\_SRS,b,f,c}(q_s) + 10\log_{10}(2^{\mu} \cdot M_{SRS,b,f,c}(i)) + \\ \alpha_{SRS,b,f,c}(q_s) \cdot PL_{b,f,c}(q_d) + h_{b,f,c}(i, l) \end{Bmatrix} \quad \text{(Formula 6)}$$

Herein, i is the index of a SRS transmission, $q_s$ represents a SRS resource set, and the target power $P_{O_{SRS},b,f,c}(q_s)$ and path loss factor $\alpha_{SRS,b,f,c}(q_s)$ are the open-loop power control parameters corresponding to the SRS resource set $q_s \cdot q_d$ is an index of a reference signal used for path loss measurement, $q_d$ is used to obtain a path loss value $PL_{b,f,c}(q_d)$, and is also an open-loop power control parameter. $h_{b,f,c}(i,l)$ is a closed-loop power control adjustment state, in which l is an index of the closed-loop power control adjustment state, and different indexes of closed-loop power control adjustment states correspond to independent closed-loop power control adjustment states. The target power $P_{O_{SRS},b,f,c}(q_s)$, the path loss factor $\alpha_{SRS,b,f,c}(q_s)$ and $q_d$ are contained in the configuration parameters in the SRS resource set, and they are configured to the terminal through the high layer signaling. $h_{b,f,c}(i, l)$ may reuse the closed-loop power control adjustment state of the PUSCH, or use an independent closed-loop power control adjustment state, which depend on the RRC configuration. If it is configured by the RRC signaling that the SRS and the PUSCH use the same closed-loop power control adjustment state, the reused index l of the PUSCH closed-loop power control adjustment state may be configured, i.e. $h_{b,f,c}(i, l) f_{b,f,c}(i, l)$. If it is configured by the high layer signaling that the SRS and the PUSCH use independent closed-loop power control adjustment states, the network side indicates the TPC commands of respective SRS of each terminal through DCI format 2_3 in the common search space, and the terminal determines the closed-loop power control adjustment state according to the TPC command, which is independent of the closed-loop power control adjustment state of the PUSCH. At this time, the terminal can only support one closed-loop power control adjustment state, which is independent of the PUSCH. Furthermore, the network device configures whether the current independent closed-loop power control adjustment state uses the cumulative mode or the non-cumulative mode through high layer signaling. If the cumulative mode is used, the closed-loop power control adjustment state needs to accumulate the adjustment value indicated by the TPC commands received within a certain time window on the previous value, for example, $h_{b,f,c}(i) = h_{b,f,c}(i-i_0) + \Sigma_{m=0}^{\delta(si)-1} \delta_{SRS,b,f,c}(m)$. If the non-cumulative mode is used, the closed-loop power control adjustment state is directly equal to the adjustment value $h_{b,f,c}(i) = \delta_{SRS,b,f,c(i)}$ indicated by the lately received TPC command before a certain time.

On the basis of the above introduction, the implementation of the prior art is described below. In the prior art, one SRS resource may occupy multiple OFDM symbols, and the terminal device will transmit all antenna ports on each OFDM symbol. The multiple OFDM symbols may be used for frequency hopping or reception beam management. For example, if an SRS resource contains four antenna ports {1, 2, 3, 4}, the terminal device transmits these four antenna ports {1, 2, 3, 4} on each OFDM symbol.

However, some advanced terminal devices may support uplink transmission with 8 antennas, which requires SRS transmission on 8 antenna ports. If the terminal device transmits 8 antenna ports of the SRS resource on one OFDM symbol, each antenna port can only use ⅛ of the transmission power, which will affect the coverage range of SRS. Specifically, because of the low power of SRS, the accuracy of channel estimation will decrease, thus affecting the performance of uplink or downlink data transmission.

Aiming at the problems in the prior art, the present disclosure proposes the following technical conception. The number of antenna ports transmitted in each OFDM symbol can be reduced by transmitting different antenna ports of one SRS resource in multiple OFDM symbols, so that the transmission power of each antenna port can be improved, the problem of limited SRS transmission power can be solved, the coverage range of SRS transmission can be improved, and the performance of channel estimation can be effectively improved at the same time.

Before introducing the technical solutions of the present disclosure, the protocol layer logic of "transmitting antenna ports of the SRS on OFDM symbols" mentioned in the present disclosure is introduced firstly. The corresponding physical resource of transmission (i.e. occupied RE) and the SRS sequence used for transmission may be defined by each antenna port. At this time, the antenna ports of the SRS are transmitted on the OFDM symbols, that is, the SRS sequences corresponding to the antenna ports are transmitted on the physical resource (RE) corresponding to the antenna ports in the OFDM symbols. "Transmitting the antenna ports of the SRS on OFDM symbols" is a simplified description commonly used in physical layer protocols at present.

Figure 3:
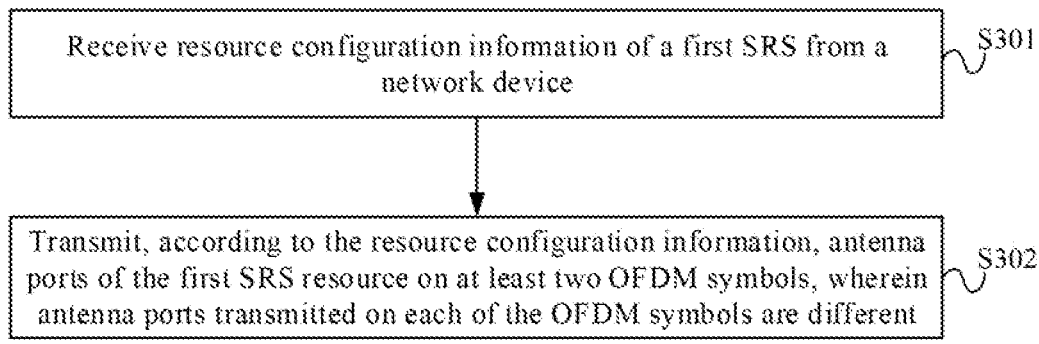
FIG. 3 is a flowchart of a method for transmission provided by the embodiments of the present disclosure.

The method for transmission provided by the present disclosure is described below in combination with specific embodiments. FIG. 3 is a flowchart of the method for transmission provided by the embodiments of the present disclosure.

As illustrated in FIG. 3, the method includes the following operations.

In operation S301, resource configuration information of a first SRS from a network device is received.

In this embodiment, the terminal device may receive the resource configuration information of the first SRS transmitted by the network device. The resource configuration information is used to indicate the configuration used for the SRS transmission, such as a physical resource, a sequence, a beam, a usage and other information. In the actual implementation process, the specific implementation mode of the resource configuration information may be selected according to the actual demand, and all the information used to indicate the configuration used for the SRS transmission may be taken as the resource configuration information in this embodiment, which is not limited in this embodiment.

In operation S302, antenna ports of the first SRS resource are transmitted on at least two OFDM symbols according to the resource configuration information, wherein antenna ports transmitted on each of the OFDM symbols are different.

After the terminal device receives the resource configuration information, the antenna ports of the first SRS resource may be transmitted on at least two OFDM symbols according to the resource configuration information. The antenna ports transmitted on various OFDM symbols are different, which may be understood that the antenna ports of the first SRS resource are respectively transmitted on multiple OFDM symbols, thereby effectively reducing the number of antenna ports transmitted on each OFDM symbol.

The number of antenna ports transmitted on each OFDM symbol may be the same or different. The embodiment does not limit the number of antenna ports transmitted on each OFDM symbol, which may be for example configured by the network device, and the antenna ports specifically transmitted on each OFDM symbol may also be selected according to actual requirements, which is not limited in the embodiment.

The method for transmission provided by the embodiments of the present disclosure includes receiving the resource configuration information of a first SRS from the network device, and transmitting antenna ports of the first SRS resource on at least two OFDM symbols according to the resource configuration information. The antenna ports transmitted on various OFDM symbols are different. The number of antenna ports transmitted on each OFDM symbol may be reduced by dispersing different antenna ports of the SRS resource to different OFDM symbols for transmission, so that the transmission power of each antenna port can be improved, the coverage range of SRS transmission can be improved, and the performance of channel estimation can be effectively improved.

On the basis of the above introduction, various possible implementation modes in SRS transmission process are introduced in the following.

Based on the above description, it can be determined that in the present embodiment, the terminal device may transmit different antenna ports of the first SRS resource on at least two OFDM symbols according to resource configuration information, and the resource configuration information may indicate, for example, the transmission mode.

In one possible implementation mode, the resource configuration information for example may include first information. The first information is configured to indicate a number of OFDM symbols that are used for transmitting different antenna ports of the first SRS resource, or, the first information is configured to indicate that whether at least two OFDM symbols are used for transmitting the different antenna ports of the first SRS resource.

For example, the first information is configured to indicate whether the number of OFDM symbols that are used for transmitting different antenna ports of the first SRS resource is 1, 2, or 4. For example, the first information may be indicated with 2 bits. For example, it may be understood in combination with FIG. 4. FIG. 4 is a schematic diagram for an implementation of the first information indicating the number of OFDM symbols provided by the embodiments of the present disclosure.

As illustrated in FIG. 4, the first information is 2 bit. It is assumed that when the first information is 00, it is indicated that the number of OFDM symbols that are used for transmitting different antenna ports of a SRS resource is 1. When the first information is 01, it is indicated that the number of OFDM symbols that are used for transmitting different antenna ports of a SRS resource is 2. When the first message is 10, it is indicated that the number of OFDM symbols that are used for transmitting different antenna ports of a SRS resource is 4.

In the actual implementation process, the number of OFDM symbols specifically indicated by the two bits of the first information may also be selected and expanded accordingly to the actual requirements. For example, when the first information is 01, it is indicated that the number of OFDM symbols is 1, when the first information is 10, it is indicated that the number of OFDM symbols is 2, when the first information is 11, it is indicated that the number of OFDM symbols is 4, etc. The embodiment does not limit the specific corresponding relationship, as long as the four states indicated by the two bits indicate the different number of OFDM symbols respectively.

At the same time, in the actual implementation process, in addition to the number of OFDM symbols that are used for transmitting different antenna ports of an SRS resource may be any one of the above-mentioned 1, 2 and 4, more implementation modes can be set. The embodiment also does not limit this, and when the number of optional OFDM symbols has more implementation modes, the bits corresponding to the first information may also be expanded accordingly, as long as the first information can correspondingly indicate the number of OFDM symbols.

Alternatively, the first information may also use 1 bit to indicate whether multiple OFDM symbols are used to transmit different antenna ports of an SRS resource. For example, it may be understood in combination with FIG. 5, and FIG. 5 is a second schematic diagram for an implementation of the first information indicating the number of OFDM symbols provided by the embodiments of the present disclosure.

As illustrated in FIG. 5, the first information is 1 bit. It is assumed that when the first information is 1, for example, it is indicated that different antenna ports of a SRS resource may be transmitted by using two OFDM symbols, that is, different antenna ports of a SRS resource are transmitted by using multiple OFDM symbols. When the first information is 0, for example, it is indicated that different antenna ports of a SRS resource are transmitted by using one OFDM symbol, that is, not use multiple OFDM symbols to transmit different antenna ports of a SRS resource.

In the above, the first information in the resource configuration information directly indicates the number of OFDM symbols that are used for transmitting different antenna ports, or directly indicates whether multiple OFDM symbols are used to transmit different antenna ports. In another implementation, the resource configuration information may include second information. The second information is configured to indicate a cyclic shift value or a comb index of the SRS. The terminal device may determine a number of OFDM symbols that are used for transmitting different antenna ports of the first SRS resource according to the cyclic shift value or the comb index, or determine that at least two OFDM symbols are used for transmitting different antenna ports of the first SRS resource according to the cyclic shift value or the comb index.

In one embodiment, for example, it may be understood in combination with FIG. 6. FIG. 6 is a schematic diagram for an implementation of the second information indicating the cyclic shift value of the SRS provided by the embodiments of the present disclosure.

As illustrated in FIG. 6, the second information is used to indicate the cyclic shift value $n_{srs}^{cs}$ of the SRS. When $n_{srs}^{cs}$ takes the first half values (i.e. less than $n_{srs}^{cs,max}/2$, $n_{srs}^{cs,max}$ is the total number of cyclic shift values), the number of OFDM symbols is 1, i.e. only one OFDM symbol is used to transmit different antenna ports of a SRS resource. When $n_{srs}^{cs}$ takes the latter half values (i.e. greater than or equal to $n_{srs}^{cs,max}/2$), the number of OFDM symbols is 2, i.e. multiple OFDM symbols are used for transmitting different antenna ports of a SRS resource.

In another embodiment, for example, it may be understood in combination with FIG. 7. FIG. 7 is a schematic diagram for an implementation of the second information indicating the comb index of the SRS provided to the embodiments of the present disclosure.

As illustrated in FIG. 7, the second information is used to indicate the comb index of the SRS. When the comb index takes the first half values (i.e. less than $n_{comb}^{max}/2$, $n_{comb}^{max}$ is the comb number of the comb structure, which can be 2 or 4), the number of OFDM symbols is 1, that is, only one OFDM symbol is used to transmit different antenna ports of one SRS resource. When the comb index takes the latter half values (i.e. greater than or equal to $n_{comb}^{max}/2$), the number of OFDM symbols is 2, that is, multiple OFDM symbols are used for transmitting different antenna ports of a SRS resource.

In the actual implementation process, in addition to the implementation modes described in FIG. 6 and FIG. 7, the specific implementation modes of the number of OFDM symbols indicated by the cyclic shift value or the comb index of the SRS may also be selected according to the needs. For example, when the comb index takes the latter half values, it is indicated that the number of OFDM symbols may also be 4, etc. This embodiment does not make special restrictions on this, and various possible implementation modes can be expanded accordingly.

In the actual implementation process, the first information and the second information described above may be individually configured for each SRS resource or uniformly configured for a SRS resource set.

In the above, the relevant implementation modes of the resource configuration information are introduced. On the basis of the above introduction, the SRS resource in the present disclosure may be configured with repetition, for example, and at least two OFDM symbols in the present embodiment may be the basic units of repetition.

Figure 8:
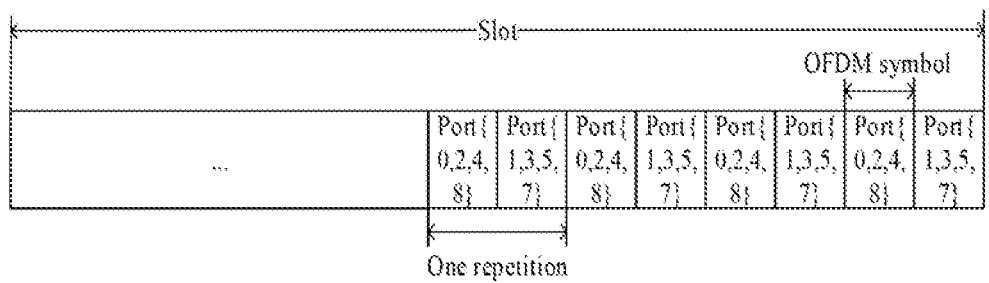
FIG. 8 is a schematic diagram for an implementation of the repetition provided by the embodiments of the present disclosure.

Specifically, the terminal device regards SRS transmission on multiple OFDM symbols as a time of repetition. For example, the multiple OFDM symbols are two OFDM symbols, and if the SRS resource is configured with four times of repetitions, the terminal device needs to perform repetition on eight OFDM symbols, which may be understood for example in combination with FIG. 8. FIG. 8 is a schematic diagram for an implementation of the repetition provided by the embodiments of the present disclosure.

As illustrated in FIG. 8, at present, the multiple OFDM symbols are two OFDM symbols, that is, different antenna ports of the SRS are transmitted on two symbols. For example, referring to FIG. 8, antenna port 0, 2, 4, 8 are transmitted on the eighth penultimate symbol, and antenna port 1, 3, 5, 7 are transmitted on the seventh penultimate OFDM symbol. It is assumed that the current SRS is configured with four times of repetition, the eighth penultimate symbol and the seventh penultimate symbol may be used as the basic units of the repetition. As illustrated in FIG. 8, four times of repetition are performed for the antenna ports transmitted on the eighth penultimate symbol and the seventh penultimate symbol, and repetitions are performed on the eight OFDM symbols shown in FIG. 8 respectively.

The SRS resource in the present disclosure may also be configured with frequency hopping, and at least two OFDM symbols in the present embodiment may be basic units of frequency hopping.

Figure 9:
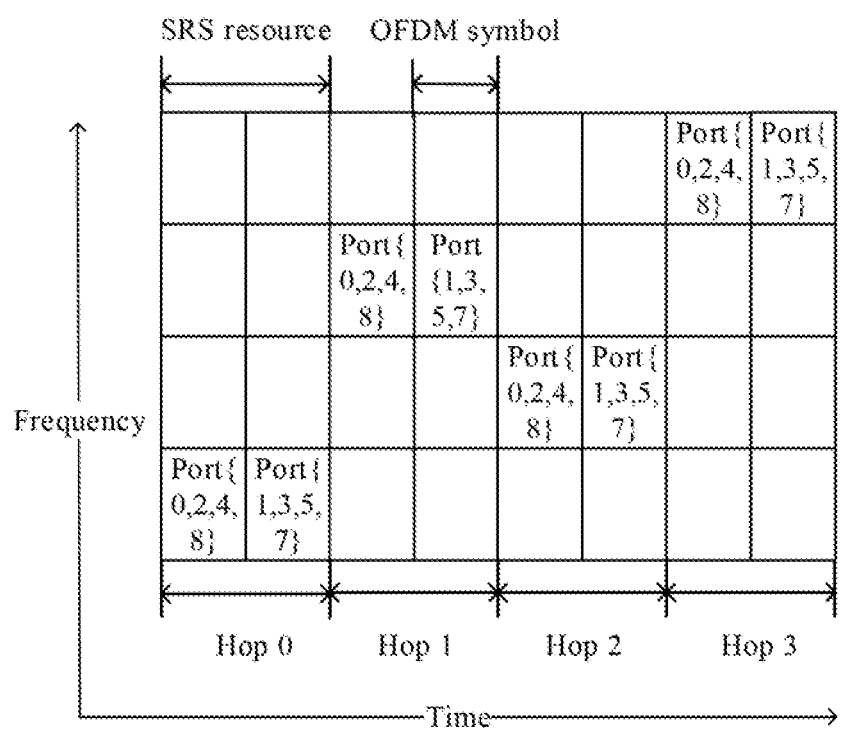
FIG. 9 is a schematic diagram for an implementation of frequency hopping provided by the embodiments of the present disclosure.

Specifically, it is assumed that multiple OFDM symbols are 2 OFDM symbols and the SRS resource occupies 8 OFDM symbols, the terminal device may perform four times of frequency hopping in 8 OFDM symbols, and each time of frequency hopping occupies 2 OFDM symbols to transmit SRS resources of different ports. For example, it may be understood in combination with FIG. 9. FIG. 9 is a schematic diagram for an implementation of frequency hopping provided by the embodiments of the present disclosure.

As illustrated in FIG. 9, at present, the multiple OFDM symbols are two OFDM symbols, that is, different antenna ports of the SRS are transmitted on the two symbols. For example, referring to FIG. 8, antenna port 0, 2, 4, 8 are transmitted on one of the OFDM symbols, and antenna port 1, 3, 5, 7 are transmitted on the other OFDM symbol. At the same time, the current SRS resource occupies eight OFDM symbols illustrated in FIG. 9, then the terminal device may perform four times of frequency hopping in the eight OFDM symbols illustrated in FIG. 9, i.e., frequency hopping 0, frequency hopping 1, frequency hopping 2 and frequency hopping 3 in FIG. 9. Each time of frequency hopping occupies two OFDM symbols to transmit SRS resources of different ports.

In another embodiment, the SRS resource may be configured with both frequency hopping and repetition. It is assumed that the total number of OFDM symbols occupied by an SRS resource is N, different antenna ports of an SRS resource occupy K OFDM symbols, and the current number of repetition is R. If R=1, the terminal needs to perform N/K times of frequency hopping in the N OFDM symbols. If N/K=R, the terminal performs only R times of repetitions in the N OFDM symbols. If N/K>R, the terminal device performs N/(K*R) times of frequency hopping with R times of repetition as a unit, and each time of repetition occupies K symbols.

Figure 10:
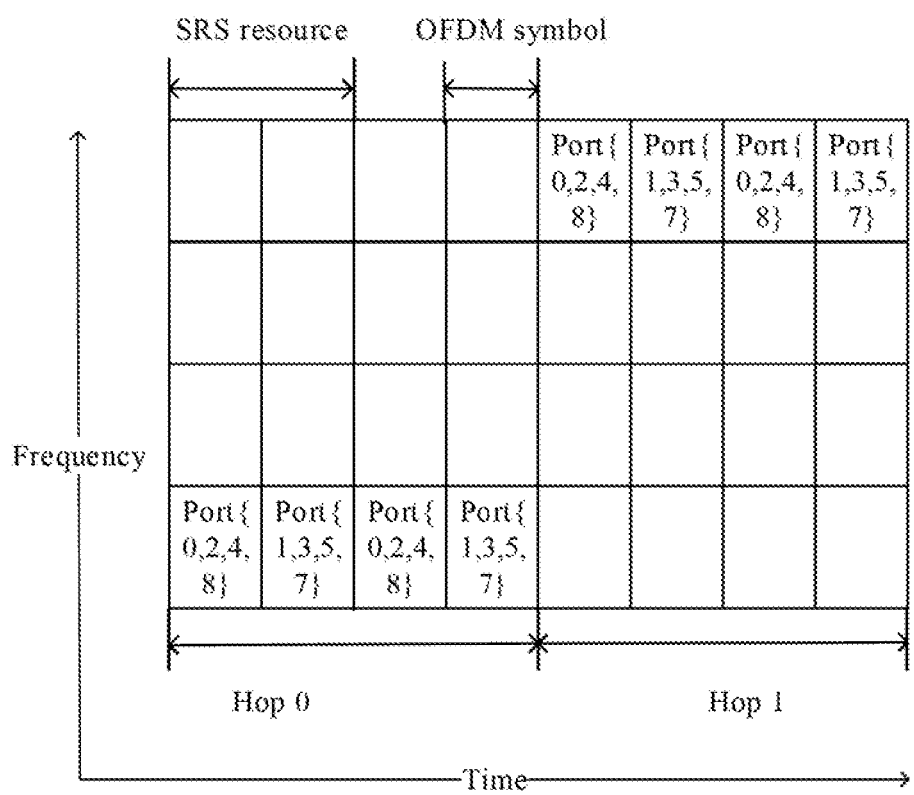
FIG. 10 is a schematic diagram for an implementation of simultaneously configuring repetition and frequency hopping provided by the embodiments of the present disclosure.

For example, it may be understood in combination with FIG. 10. FIG. 10 is a schematic diagram for an implementation of simultaneously configuring repetition and frequency hopping provided by the embodiments of the present disclosure. As illustrated in FIG. 10, it is assumed that the number of repetition is 2 (R=2), and the total number of OFDM symbols occupied by one SRS resource is 8 (N=8), and it is assumed that two OFDM symbols (K=2) are occupied by different antenna ports of one SRS resource, then N/K>R may be determined. As illustrated in FIG. 8, the terminal device may perform two times of frequency hopping, i.e., frequency hopping 0 and frequency hopping 1 in FIG. 10. Each time of frequency hopping includes two times of repetition, and the basic unit of each time of repetition is at least two OFDM symbols for transmitting different SRS symbols, i.e. the OFDM symbol including antenna port 0, 2, 4, 8 and the OFDM symbol including antenna port 1, 3, 5, 7, as shown in FIG. 10.

On the basis of the above introduction, when the terminal device transmits the antenna ports of the first SRS resource on at least two OFDM symbols, for example, the transmission power of each antenna port may be determined, and then the respective antenna ports of the first SRS resource may be transmitted according to the transmission power.

Specifically, the terminal device may determine a transmission power for transmitting each of the antenna ports according to a number of antenna ports transmitted on each of the at least two OFDM symbols, and/or according to the number of the at least two OFDM symbols. The antenna ports of the first SRS resource are then transmitted on at least two OFDM symbols according to transmission power.

Several different implementation modes for determining the transmission power of each antenna port are introduced below.

In one embodiment, if the number of antenna ports transmitted on each OFDM symbol in multiple OFDM symbols is M and the linear value of transmission power determined by the terminal device after power control is P, the transmission power on each antenna port is P/M.

In another embodiment, if the number of antenna ports transmitted by the terminal device on two OFDM symbols is $\{M_1, M_2\}$, respectively, and the linear value of transmission power determined by the terminal device after power control is P, the transmission power of the antenna port on the two OFDM symbols is $\{P/M_1, P/M_2\}$, respectively, or the transmission power of different antenna ports on the two OFDM symbols is the same, which is $P/\max(M_1, M_2)$ or $\min(P/M_1, P/M_2)$.

In another embodiment, if the number of antenna ports transmitted on one OFDM symbol in multiple OFDM symbols is M, the total number of antenna ports included in the SRS resource is K, the maximum transmission power supported by the terminal at one moment is $P_{c,max}$, and the transmission power calculated based on uplink power control is $P_{int}$, the linear value of transmission power of the terminal on the OFDM symbol is $P=\min(P_{c,max}, M/K*P_{int})$, and the transmission power of each antenna port is $P_n=P/M=\min(P_{c,max}, M/K*P_{int})/K$.

In another embodiment, if the number of antenna ports transmitted by the terminal device on two OFDM symbols is $\{M_1, M_2\}$, respectively, the total number of antenna ports included in the SRS resource is K, the maximum transmission power supported by the terminal at one time is $P_{c,max}$, and the transmission power calculated based on uplink power control is $P_{int}$, the linear values of transmission powers of the terminal on various OFDM symbols are $P_1=\min(P_{c,max}, M_1/K*P_{int})$ and $P2=\min(P_{c,max}, M2/K*P_{int})$, and the final actual transmission power on each antenna port is $P_n=\min(P_1/M_1, P_2/M_2)$.

In another embodiment, the number of antenna ports on different OFDM symbols is the same, and the terminal device may determine the transmission power of each port based on the number of multiple OFDM symbols.

For example, it is assumed that the number of multiple OFDM symbols is N and the linear value of transmission power determined by the terminal device after power control is P, the transmission power on each antenna port is N*P/K, where K is the total number of antenna ports included in the SRS resource. It may be seen that, compared with transmitting K antenna ports on one OFDM symbol, transmitting K antenna ports with N OFDM symbols can increase the transmission power on each antenna port by N times, thus effectively improving the receiving power and channel estimation performance of the SRS and enhancing the coverage range of the SRS.

In another embodiment, it is assumed that the number of multiple OFDM symbols is N, the number of antenna ports transmitted on one OFDM symbol is M, the total number of antenna ports included in the SRS resource is K, the maximum transmission power supported by the terminal at one moment is $P_{c,max}$, and the transmission power calculated based on the uplink power control is $P_{int}$, the linear value of the transmission power of the terminal on one OFDM symbol is P=min ($P_{c,max}$, $P_{int}$/N). The transmission power of each antenna port is $P_n$=min ($P_{c,max}$, $P_{int}$/N)*N/K, or $P_n$=min ($P_{c,\ max}$, $P_{int}$/N)/M, or $P_n$=min (N*$P_{c,max}$, $P_{int}$)/K.

In an actual implementation process, in at least two OFDM symbols for transmitting antenna ports, the number of antenna ports that are transmitted on each OFDM symbol may be predetermined by the network device and the terminal device, or may also be indicated to the terminal device by the resource configuration information.

For example, the terminal device and the network device may predetermine that the number of antenna ports transmitted on each OFDM symbol is the same, that is, all antenna ports are bisected on various OFDM symbols.

In another embodiment the number of antenna ports on different OFDM symbols may also be different. At this time, for example, the network device may indicate to the terminal device whether the number of antenna ports on different OFDM symbols is the same by high layer signaling, or the network device may indicate the respective number of antenna ports on each OFDM symbol by high layer signaling.

For example, if the SRS resource contains 8 antenna ports, and the number of OFDM symbols used to transmit the antenna ports is 2, the network device may indicate that the number of antenna ports on the two OFDM symbols is 4 and 4, respectively, or may also be 2 and 6, respectively.

In the actual implementation process, the number of antenna ports configured on each OFDM symbol can be selected according to actual requirements, and the embodiment does not limit this.

Figure 11:
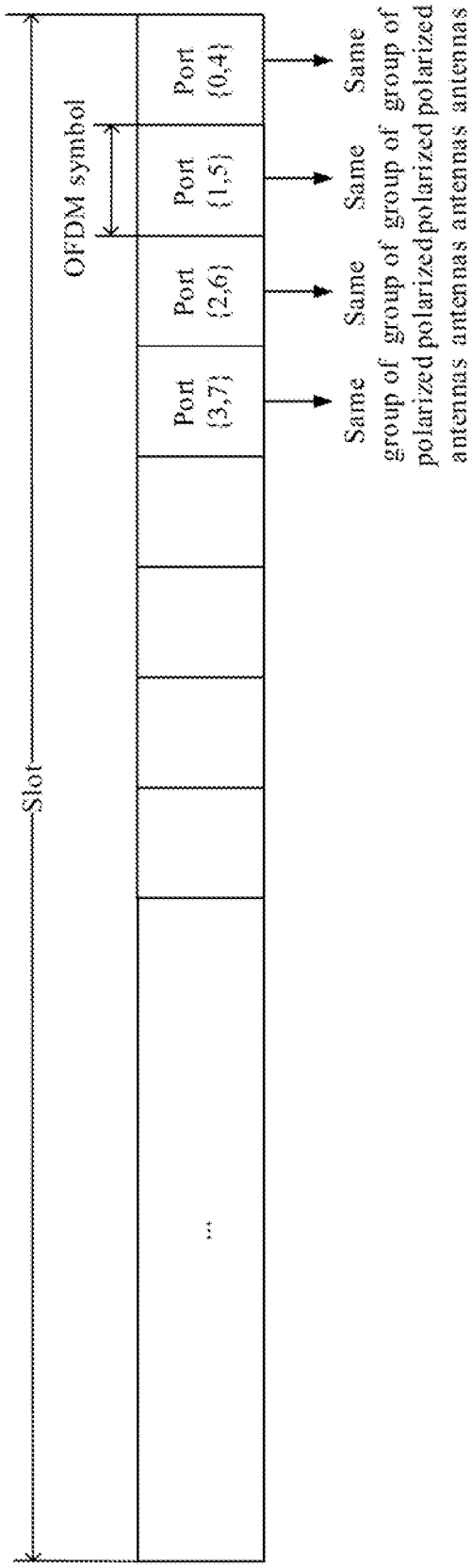
FIG. 11 is a first schematic diagram for an implementation of transmitting different antenna ports on multiple OFDM symbols provided by the embodiments of the present disclosure.
Figure 12:
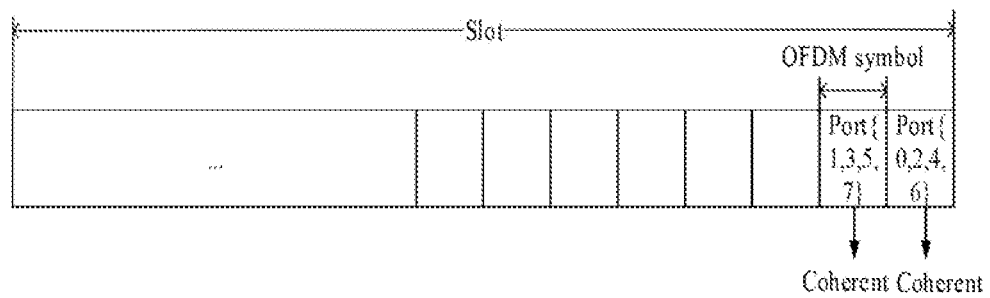
FIG. 12 is a second schematic diagram for an implementation of transmitting different antenna ports on multiple OFDM symbols provided by the embodiments of the present disclosure.
Figure 13:
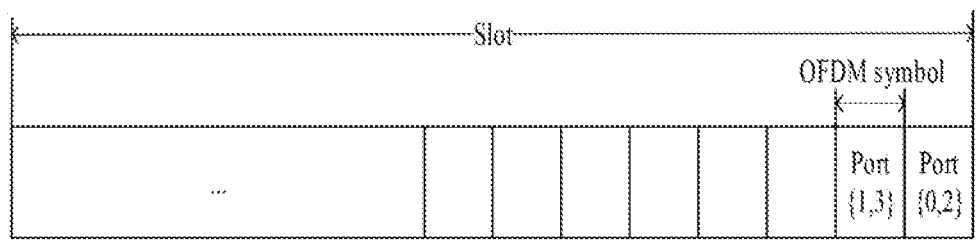
FIG. 13 is a third schematic diagram for an implementation of transmitting different antenna ports on multiple OFDM symbols provided by the embodiments of the present disclosure.
Figure 14:
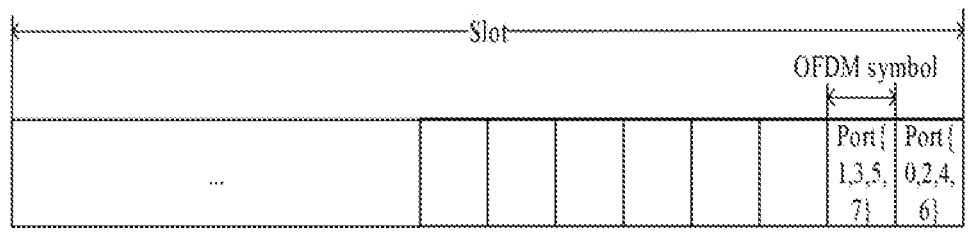
FIG. 14 is a fourth schematic diagram for an implementation of transmitting different antenna ports on multiple OFDM symbols provided by the embodiments of the present disclosure.
Figure 15:
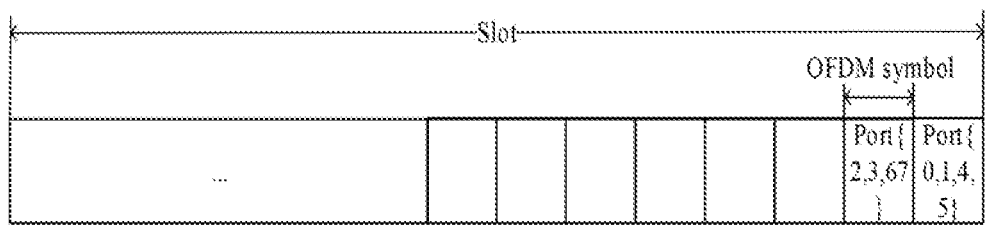
FIG. 15 is a fifth schematic diagram for an implementation of transmitting different antenna ports on multiple OFDM symbols provided by the embodiments of the present disclosure.
Figure 16:
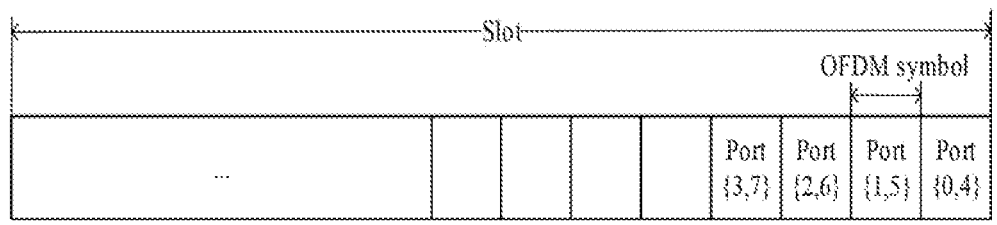
FIG. 16 is a sixth schematic diagram for an implementation of transmitting different antenna ports on multiple OFDM symbols provided by the embodiments of the present disclosure.

In the method for transmission provided by the present disclosure, the terminal device transmits different antenna ports of one SRS resource on at least two OFDM symbols, and may use multiple different methods. Several possible implementation modes are described below in combination with FIG. 11 to FIG. 16. FIG. 11 is a first schematic diagram for an implementation of transmitting different antenna ports on multiple OFDM symbols provided by the embodiments of the present disclosure. FIG. 12 is a second schematic diagram for an implementation of transmitting different antenna ports on multiple OFDM symbols provided by the embodiments of the present disclosure. FIG. 13 is a third schematic diagram for an implementation of transmitting different antenna ports on multiple OFDM symbols provided by the embodiments of the present disclosure. FIG. 14 is a fourth schematic diagram for an implementation of transmitting different antenna ports on multiple OFDM symbols provided by the embodiments of the present disclosure. FIG. 15 is a fifth schematic diagram for an implementation of transmitting different antenna ports on multiple OFDM symbols provided by the embodiments of the present disclosure. FIG. 16 is a sixth schematic diagram for an implementation of transmitting different antenna ports on multiple OFDM symbols provided by the embodiments of the present disclosure.

In one possible implementation, antenna ports corresponding to the same group of polarized antennas are transmitted in the same OFDM symbol. For example, it may be understood with reference to FIG. 11. Referring to FIG. 11, antenna port 0 and antenna port 4 correspond to the same group of polarized antennas, and antenna port 0 and antenna port 4 may be transmitted in the same OFDM symbol. The antenna port 1 and antenna port 5 correspond to the same group of polarized antennas, and the antenna port 1 and antenna port 5 may be transmitted in the same OFDM symbol. The antenna port 2 and antenna port 6 correspond to the same group of polarized antennas, and the antenna port 2 and antenna port 6 may be transmitted in the same OFDM symbol. The antenna port 3 and antenna port 7 correspond to the same group of polarized antennas, and the antenna port 3 and antenna port 7 may be transmitted in the same OFDM symbol.

In another possible implementation, coherent antenna ports are transmitted in the same OFDM symbol. For example, it may be understood with reference to FIG. 12. Referring to FIG. 12, in the eight antenna ports of the SRS resource, antenna port {0, 2, 4, 6} are coherent and antenna port {1, 3, 5, 7} are coherent, then antenna port {0, 2, 4, 6} may be transmitted in one OFDM symbol and antenna port {1, 3, 5, 7} may be transmitted in the other OFDM symbol, i.e. antenna port {0, 2, 4, 6} and antenna port {1, 3, 5, 7} may be transmitted on different OFDM symbols.

In another possible implementation, at least two OFDM symbols for transmitting antenna ports are two OFDM symbols and the number of antenna ports of the SRS resources is four. For example, it may be understood with reference to FIG. 13. Referring to FIG. 13, antenna port {0, 2} are transmitted on one of the OFDM symbols and antenna port {1, 3} are transmitted on another of the OFDM symbols.

FIG. 13 illustrates only one possible implementation. For example, antenna port {0, 1} may also be transmitted on one of the OFDM symbols, and antenna port {2, 3} may be transmitted on the other OFDM symbol. Alternatively, antenna port {0, 3} may be transmitted on one of the OFDM symbols, and antenna port {1, 2} may be transmitted on the other OFDM symbol. Alternatively, the number of antenna ports transmitted on two OFDM symbols may be different. For example, antenna port {0} is transmitted on one of the OFDM symbols, and antenna port {1, 2, 3} are transmitted on the other OFDM symbol. For example, antenna port {1} is transmitted on one of the OFDM symbols, and antenna port {0, 2, 3} are transmitted on the other OFDM symbol. For example, antenna port {2} is transmitted on one of the OFDM symbols, and antenna port {0, 1, 3} are transmitted on the other OFDM symbol. For example, antenna port {3} is transmitted on one of the OFDM symbols, and antenna port {0, 1, 2} are transmitted on the other OFDM symbol, and the like. Other various possible implementations may be selected according to actual requirements, and the present embodiment is not limited thereto.

In the actual implementation process, for example, the transmission of antenna port {0, 2} and antenna port {1, 3}, the antenna port {0, 2} may be transmitted on the first OFDM symbol and antenna port {1, 3} may be transmitted on the second antenna port. Alternatively, the antenna port {0, 2} may be transmitted on the second OFDM symbol, and the antenna port {1, 3} may be transmitted on the first antenna port. The embodiment does not limit this, and only ensures that the antenna port {0, 2} is transmitted on one of the OFDM symbols, and the antenna port {1, 3} is transmitted on the other OFDM symbol, that is, only ensures that different antenna ports are transmitted on two OFDM symbols.

In another possible implementation, at least two OFDM symbols for transmitting antenna ports are two OFDM symbols and the number of antenna ports of the SRS resource is eight. For example, it may be understood with reference to FIG. 14. Referring to FIG. 14, antenna port {0, 2, 4, 6} are transmitted on one of the OFDM symbols and antenna port {1, 3, 5, 7} are transmitted on the other OFDM symbol.

In another possible implementation, at least two OFDM symbols for transmitting antenna ports are two OFDM symbols and the number of antenna ports of the SRS resource is eight. For example, it may be understood with reference to FIG. 15. Referring to FIG. 15, antenna port {0, 1, 4, 5} are transmitted on one of the OFDM symbols and antenna port {2, 3, 6, 7} are transmitted on the other OFDM symbol.

Similarly, FIG. 14 and FIG. 15 illustrate only possible implementations, for example, antenna port {0, 1, 2, 3} may also be transmitted on one of the OFDM symbols, antenna port {4, 5, 6, 7} may be transmitted on the other OFDM symbol, etc. Other possible implementations may be expanded and combined according to actual requirements, and will not be repeated here. Alternatively, the number of antenna ports transmitted on two OFDM symbols may be different, for example, antenna port {0, 1, 2} are transmitted on one OFDM symbol, and antenna port {3, 4, 5, 6, 7} are transmitted on the other OFDM symbol. Similarly, other possible implementations may be expanded and combined according to actual requirements, and will not be repeated here. On which OFDM symbol the antenna port is transmitted may also be selected according to the actual requirements. The embodiment does not limit this and only ensures that different antenna ports are transmitted on two OFDM symbols.

In another possible implementation, at least two OFDM symbols for transmitting antenna ports are four OFDM symbols and the number of antenna ports of SRS resources is eight, for example, it may be understood with reference to FIG. 16. Referring to FIG. 16, antenna port {0, 4} are transmitted on the first OFDM symbol, antenna port {1, 5} are transmitted on the second OFDM symbol, antenna port {2, 6} are transmitted on the third OFDM symbol, and antenna port {3, 7} are transmitted on the fourth OFDM symbol. The first OFDM symbol, the second OFDM symbol, the third OFDM symbol and the fourth OFDM symbol are four different OFDM symbols in the said four OFDM symbols.

FIG. 16 illustrates only one possible implementation. For example, antenna port {0, 1}, {2, 3}, {4, 5}, {6, 7} may be transmitted on 4 OFDM symbols respectively, and other possible implementations may be expanded and combined according to actual requirements, which will not be repeated here. Alternatively, the number of antenna ports transmitted on the four OFDM symbols may be different, for example, antenna port {0}, {1, 2, 3}, {4, 5}, {6, 7} are respectively transmitted on the four OFDM symbols. Similarly, other possible implementations may be expanded and combined according to actual requirements, and will not be repeated here. On which OFDM symbol the antenna port is transmitted may also be selected according to the actual requirements. The embodiment does not limit this and only ensures that different antenna ports are transmitted on four OFDM symbols.

To sum up, in the method for transmission provided in the present embodiment, when transmitting different antenna ports of the SRS on at least two OFDM symbols, it is assumed that the number of antenna ports of the SRS is X and the number of at least two OFDM symbols is Y, $M_1$, $M_2$, ... $M_y$ antenna ports may be respectively transmitted in each of the Y OFDM symbols. The antenna port transmitted on each OFDM symbol may be selected according to the actual requirements, the embodiment does not limit this, as long as the antenna ports transmitted on each OFDM symbol are different, and $M_1$, $M_2$, ... $M_y$ may be identical to each other or different from each other, it may also be selected according to the actual requirements. However, it should be noted that the sum of $M_1$, $M_2$, ... $M_Y$ is X, that is to say, X antenna ports of the SRS are allocated to Y different OFDM symbols to be transmitted separately, and the specific allocation mode of antenna ports may be selected according to actual requirements, in which the values of X may be 4 and 8, and the values of Y can be 2 and 4, for example.

In the method for transmission provided by the present disclosure, in at least two OFDM symbols used for transmitting antenna ports, the frequency domain resources, transmission beams and/or transmission power used by antenna ports transmitted on various OFDM symbols are the same.

In one embodiment, antenna ports transmitted on different OFDM symbols occupy the same physical resource block (PRB) and use the same comb index. That is, the same subcarrier is occupied for transmission.

In one embodiment, antenna ports transmitted on different OFDM symbols use the same reference signal to obtain spatial relation information, or use the same Transmission Configuration Information (TCI) state.

In one embodiment, different antenna ports transmitted on different OFDM symbols use the same transmission power, regardless of whether the number of ports on these symbols is the same.

In the method for transmission provided by the present disclosure, in at least two OFDM symbols used for transmitting antenna ports, antenna ports transmitted on different OFDM symbols use different cyclic shift values.

In one possible implementation, if the maximum value $n_{srs}^{max}$ of cyclic shifts is equal to 12 and the number of at least two OFDM symbols is 2, the cyclic shift value used by the antenna port transmitted on one of the two OFDM symbols is a first combination, the cyclic shift value used by the antenna port transmitted on another OFDM symbol is a second combination, and the first combination and the second combination are any two of the following combinations: {0, 3, 6, 9}, {1, 4, 7, 10}, {2, 5, 8, 11}.

That is to say, the cyclic shift values used by antenna ports transmitted on different OFDM symbols are two of the following combinations: {0, 3, 6, 9}, {1, 4, 7, 10}, {2, 5, 8, 11}. For example, for a case where the number of antenna ports of an SRS resource is 8, a cyclic shift value used by the antenna port on one OFDM symbol is $(\{0,3,6,9\}+n_{srs}^{cs})$ mod $n_{srs}^{cs,max}$ and a cyclic shift value used by the antenna port on another OFDM symbol is $(\{1,4,7,10\}+n_{srs}^{cs})$ mod $n_{srs}^{cs,max}$ $n_{srs}^{cs}$ is the initial cyclic shift value configured by the high layer signaling.

In another embodiment, if the maximum value $n_{srs}^{cs}$ of cyclic shifts equals to 12, and the number of at least two OFDM symbols is 2 and the number of antenna ports of the SRS resource is 4, the cyclic shift values used by the SRS antenna ports transmitted on the two OFDM symbols may be $\{n_{srs}^{cs},(n_{srs}^{cs}+6) \bmod n_{srs}^{cs,max}\}$ and $\{(n_{srs}^{cs}+3) \bmod n_{srs}^{cs,max}, (n_{srs}^{cs}+9) \bmod n_{srs}^{cs,max}\}$, respectively. $n_{srs}^{cs}$ is the initial cyclic shift value configured by the high layer signaling.

Alternatively, if the maximum value $n_{srs}^{cs,max}$ of cyclic shifts equals to 8, and the number of at least two OFDM symbols is 2, the cyclic shift values used by the antenna port transmitted on one OFDM symbol are $\{0, 2, 4, 6\}$, and the cyclic shift values by the antenna port transmitted on another OFDM symbol are $\{1, 3, 5, 7\}$. For example, for a case where the number of antenna ports of a SRS resource is eight, a cyclic shift value used by the antenna port on one OFDM symbol is $(\{0,2,4,6\}+n_{srs}^{cs}) \bmod n_{srs}^{cs,max}$, and a cyclic shift value used by the antenna port on another OFDM symbol is $(\{1,3,5,7\}+n_{srs}^{cs}) \bmod n_{srs}^{cs,max}$.

In another embodiment, if the total number $n_{srs}^{cs,max}$ of cyclic shiftsequals to 8, and the number of at least two OFDM symbols is 2 and the number of antenna ports of the SRS resource is 4, the cyclic shift values used by the SRS antenna ports transmitted on the two OFDM symbols may be$\{n_{srs}^{cs},(n_{srs}^{cs}+4) \bmod n_{srs}^{cs,max}\}$ and $\{(n^{cs}_{srs}+2) \bmod n_{srs}^{cs,max}, (n_{srs}^{cs}+6) \bmod n_{srs}^{cs,max}\}$ respectively.

Based on the method for determining the cyclic shift value described above, when multiple OFDM symbols are used to transmit SRS antenna ports, the cyclic shift value on each antenna port is the same as the case of a single OFDM symbol transmission, thereby ensuring backward compatibility. Moreover, the cyclic shift offset between antenna ports multiplexed on the same OFDM symbol is maximized, the interference between ports is effectively reduced and the channel estimation performance is improved.

In the method for transmission provided by the present disclosure, if the first OFDM symbol in at least two OFDM symbols is not available for uplink transmission, the terminal device does not transmit the SRS resource, or only transmits the antenna port on the OFDM symbol available for uplink transmission, or transmits the antenna port on the first OFDM symbol in the latest OFDM symbol available for uplink transmission after the first OFDM symbol. The first OFDM symbol is a part of the at least two OFDM symbols.

Figure 17:
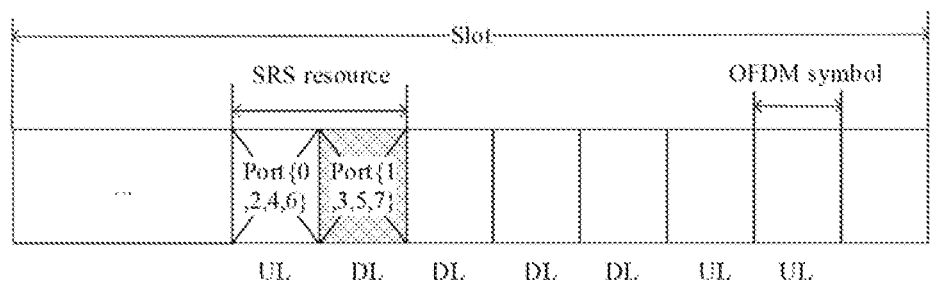
FIG. 17 is a first schematic diagram for an implementation of a part of OFDM symbols being not available for the uplink transmission provided by the embodiments of the present disclosure.

In one embodiment, the terminal device does not transmit the antenna ports of the first SRS resource. For example, it may be understood with reference to FIG. 17. FIG. 17 is a first schematic diagram for an implementation of a part of OFDM symbols being not available for the uplink transmission provided by the embodiments of the present disclosure.

It is assumed that the SRS resource is configured for transmission on two OFDM symbols illustrated in FIG. 17, but the second symbol is dynamically configured as a downlink (DL) symbol. The terminal device does not transmit the SRS resource on multiple OFDM symbols. That is, the SRS resource transmission is discarded.

Figure 18:
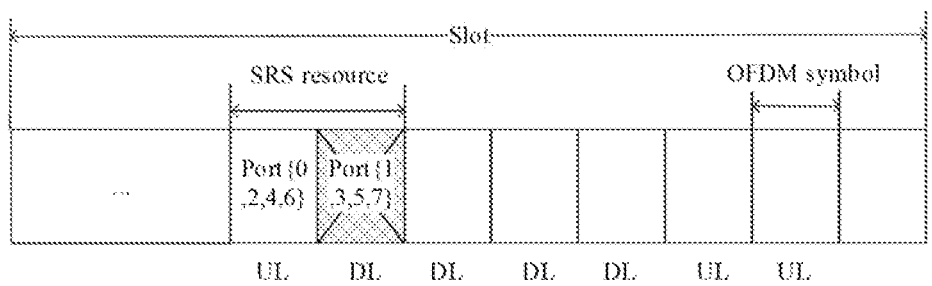
FIG. 18 is a second schematic diagram for an implementation of a part of OFDM symbols being not available for the uplink transmission provided by the embodiments of the present disclosure.

In another embodiment, the terminal device transmits only antenna ports on OFDM symbols available for uplink transmission. For example, it may be understood with reference to FIG. 18. FIG. 18 is a second schematic diagram for an implementation of a part of OFDM symbols being not available for the uplink transmission provided by the embodiments of the present disclosure.

It is assumed that the SRS resource is configured for transmission on two OFDM symbols illustrated in FIG. 18, but part of the symbols are dynamically configured as DL symbols, the terminal device does not transmit the SRS on the part of the symbols, but transmits the antenna ports of the SRS resource as usual on other OFDM symbols. For example, in FIG. 18, the first symbol is used for transmitting antenna port $\{0, 2, 4, 6\}$ and the second symbol is used for transmitting antenna port $\{1, 3, 5, 7\}$. If the second OFDM symbol is dynamically configured as a downlink symbol, the terminal device only transmits the port $\{0, 2, 4, 6\}$ on the first symbol.

Figure 19:
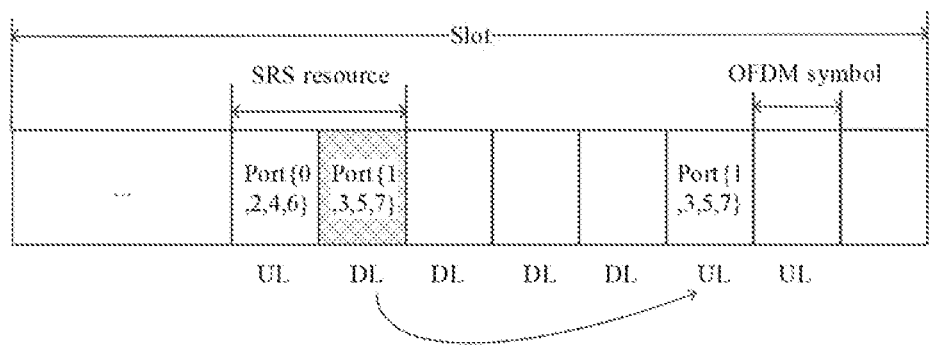
FIG. 19 is a third schematic diagram for an implementation of a part of OFDM symbols being not available for the uplink transmission provided by the embodiments of the present disclosure.

In another embodiment, the terminal device transmits the antenna ports on the first OFDM symbol in the latest OFDM symbol available for uplink transmission after the first OFDM symbol. For example, it may be understood with reference to FIG. 19. FIG. 19 is a third schematic diagram for an implementation of a part of OFDM symbols being not available for the uplink transmission provided by the embodiments of the present disclosure.

It is assumed that the SRS resource is configured for transmission on two OFDM symbols illustrated in FIG. 19. The first symbol is used for transmitting antenna port $\{0, 2, 4, 6\}$ and the second symbol is used for transmitting antenna port $\{1, 3, 5, 7\}$. If the second OFDM symbol is dynamically configured as a downlink symbol, the antenna port $\{1, 3, 5, 7\}$ are delayed for transmission on the latest uplink OFDM symbol.

In another embodiment, the terminal device does not expect that a part of the at least two OFDM symbols cannot be used for uplink transmission, i.e. the terminal expects that the at least two OFDM symbols configured for the first SRS resource are all uplink symbols and can be used for uplink transmission. Otherwise, the terminal will treat it as an erroneous configuration, so that port transmissions on the first SRS resource may not be performed. Accordingly, when the network device side configures OFDM symbols for the first SRS resource, it is necessary to ensure that the at least two OFDM symbols are uplink symbols and can be used for uplink transmission.

In the method for transmission provided by the present disclosure, if the SRS antenna port on the second OFDM symbol in at least two OFDM symbols is conflicted with other uplink signals (for example. aperiodic SRS, Physical Uplink Control Channel (PUCCH), Physical Random Access Channel (PRACH), etc.), and the priority of the conflicted uplink signals is higher than the priority of the SRS, the terminal device does not transmit SRS resource, or only transmits the antenna port on the OFDM symbols without signal collision, or transmits the antenna port on the second OFDM symbol in the latest OFDM symbol without signal collision after the second OFDM symbol. The second OFDM symbol is a part of at least two OFDM symbols.

Figure 20:
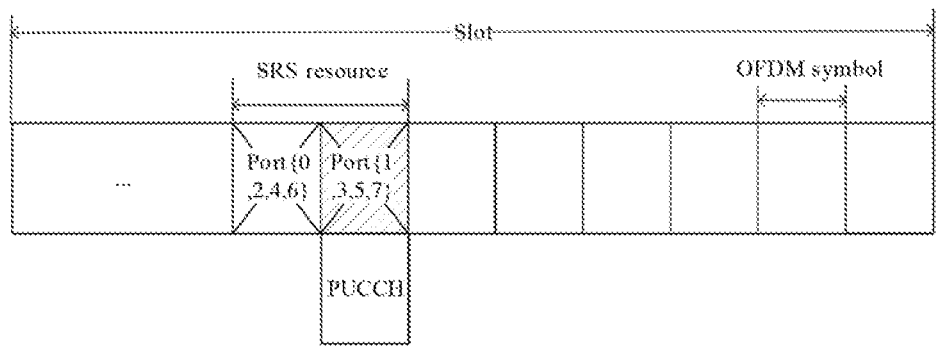
FIG. 20 is a first schematic diagram for an implementation of a part of OFDM symbols with collision provided by the embodiments of the present disclosure.

In one embodiment, the terminal device does not transmit the antenna ports of the first SRS resource. For example, it may be understood with reference to FIG. 20. FIG. 20 is a first schematic diagram for an implementation of a part of OFDM symbols with collision provided by the embodiments of the present disclosure.

It is assumed that the SRS resource is configured for transmission on two OFDM symbols illustrated in FIG. 20, the first symbol is used for transmitting antenna port $\{0, 2, 4, 6\}$, the second symbol is used for transmitting antenna port $\{1, 3, 5, 7\}$, but the second symbol is conflicted with a PUCCH with a higher priority than the first SRS, the terminal device does not transmit the SRS resource on multiple OFDM symbols. That is, the SRS resource transmission is discarded.

Figure 21:
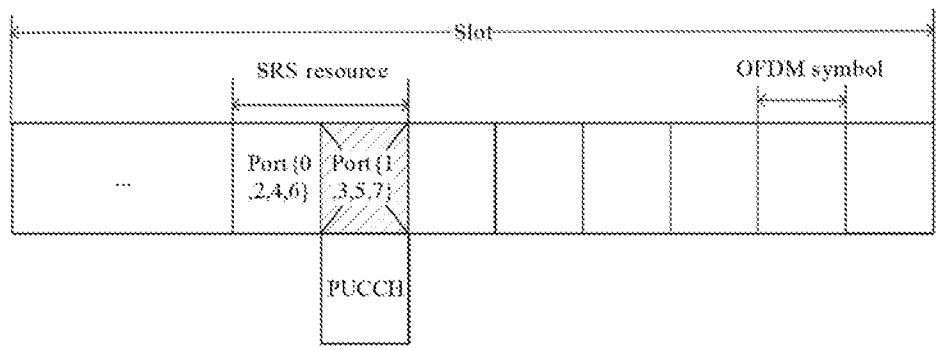
FIG. 21 is a second schematic diagram for an implementation of a part of OFDM symbols with collision provided by the embodiments of the present disclosure.

In another embodiment, the terminal device transmits only antenna ports on OFDM symbols without signal collisions. The SRS resource is configured for transmission on multiple OFDM symbols, but part of the symbols is conflicted with uplink signals with a higher priority than the SRS, then the terminal device does not transmit the SRS on the conflicted part of symbols, but can transmit antenna ports of the SRS resource as usual on other OFDM symbols. For example, it may be understood with reference to FIG. 21. FIG. 21 is a second schematic diagram for an implementation of a part of OFDM symbols with collision provided by the embodiments of the present disclosure.

It is assumed that the SRS resource is configured for transmission on two OFDM symbols illustrated in FIG. 21, the first symbol is used for transmitting antenna port {0, 2, 4, 6} and the second symbol is used for transmitting antenna port {1, 3, 5, 7}. If the second OFDM symbol is conflicted with the PUCCH transmitting the HARQ-ACK, the terminal device only transmits port {0, 2, 4, 6} on the first symbol.

Figure 22:
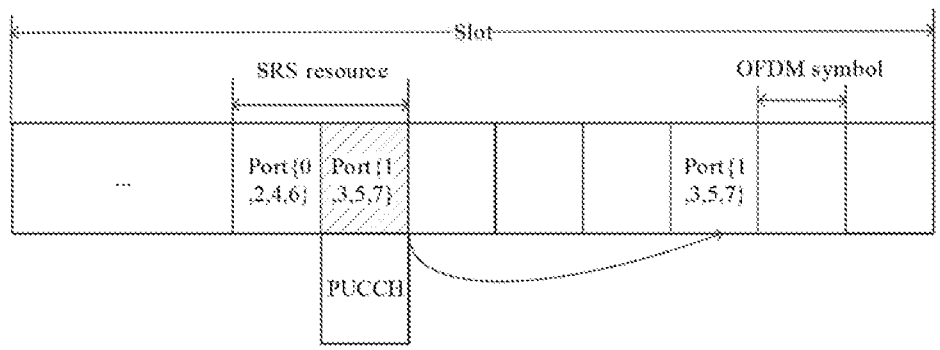
FIG. 22 is a third schematic diagram for an implementation of a part of OFDM symbols with collision provided by the embodiments of the present disclosure.

In another embodiment, the terminal device transmits the antenna ports on the second OFDM symbol in the latest uplink OFDM symbol without signal collision after the second OFDM symbol. For example, it may be understood with reference to FIG. 22. FIG. 22 is a third schematic diagram for an implementation of a part of OFDM symbols with collision provided by the embodiments of the present disclosure.

It is assumed that the SRS resource is configured for transmission on two OFDM symbols illustrated in FIG. 22, the first symbol is used for transmitting antenna port {0, 2, 4, 6} and the second symbol is used for transmitting antenna port {1, 3, 5, 7}. If the second OFDM symbol is conflicted with a PUCCH carrying HARQ-ACK information, the antenna port {1, 3, 5, 7} are delayed for transmission on the latest uplink OFDM symbol without collision.

In another embodiment, the terminal device does not expect that the SRS on a part of the at least two OFDM symbols is conflicted with other uplink signals (or with other uplink signals with higher priority), i.e. the terminal expects that the at least two OFDM symbols configured for the first SRS resource has no other uplink signals (or no other uplink signals with higher priority), can be used for transmission of the SRS. Otherwise, the terminal will treat it as an erroneous configuration, so that port transmissions on the first SRS resource may not be performed. Accordingly, when the network device side configures OFDM symbols for the first SRS resource, it is necessary to ensure that there are no other uplink signals (or other uplink signals with a higher priority) on the at least two OFDM symbols, can be used for the transmission of the SRS. This limitation may be applied within a carrier, within a carrier band, or to all carriers of a terminal.

In the method for transmission provided by the present disclosure, at least two OFDM symbols that are used for transmitting the SRS antenna ports are two or four OFDM symbols.

In the method for transmission provided by the present disclosure, at least two OFDM symbols that are used for transmitting the SRS antenna ports are multiple continuous OFDM symbols.

It should also be noted that the antenna port indexes of the SRS in the protocol start from 1000, that is, the antenna port k described in the present disclosure is equivalent to the antenna port 1000+k. For example, antenna ports 0-7 in the description of the present disclosure correspond to physical layer antenna ports 1000-1007 respectively.

To sum up, the method for transmission provided by the embodiments of the present disclosure can reduce the number of antenna ports transmitted in each OFDM symbol by transmitting different antenna ports of the same SRS resource on at least two OFDM symbols, so as to effectively improve the transmission power of each antenna port, effectively solve the problem of limited SRS transmission power, and thus improve the coverage range of SRS transmission. On the other hand, in the case of a large number of antenna ports (such as 8), dividing antenna ports into multiple OFDM symbols for transmission can also reduce the number of antenna ports multiplexed within one symbol, thus improving the orthogonality between ports (such as larger cyclic shift offset between ports) and effectively improving the performance of channel estimation.

Figure 23:
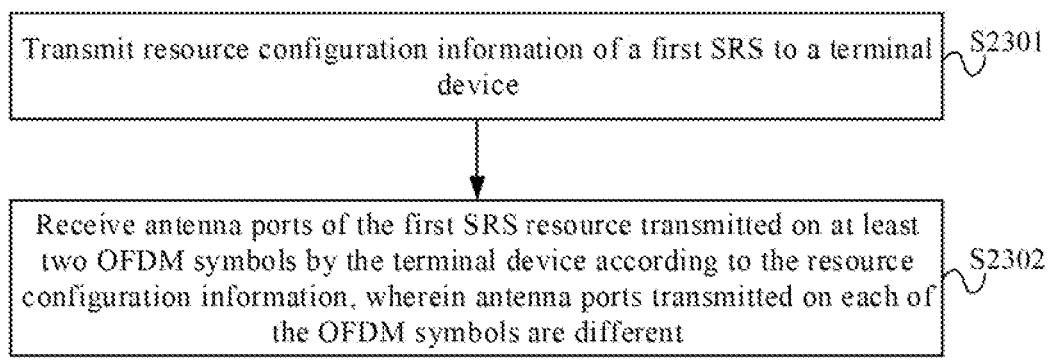
FIG. 23 is a second flowchart of the method for transmission provided by the embodiments of the present disclosure.

The above description is directed to the implementation of the terminal device side, and the implementation of the network device side will be described below with reference to FIG. 23. FIG. 23 is a second flowchart of the method for transmission provided by the embodiments of the present disclosure.

As illustrated in FIG. 23, the method includes the following operations.

In operation S2301, resource configuration information of the first SRS is transmitted to a terminal device.

In this embodiment, the network device may transmit the resource configuration information of the first SRS to the terminal device. The specific implementation of the resource configuration information is similar to that described above and will not be described here.

In operation S2302, antenna ports of the first SRS resource transmitted on at least two OFDM symbols by the terminal device are received according to the resource configuration information. Antenna ports transmitted on each of the OFDM symbols are different.

The network device may receive antenna ports of the first SRS resource transmitted on at least two OFDM symbols by the terminal device according to the resource configuration information. The antenna ports transmitted on each OFDM symbol are different. The various possible implementations are similar to those described in the above-mentioned embodiments and are not described here.

Figure 24:
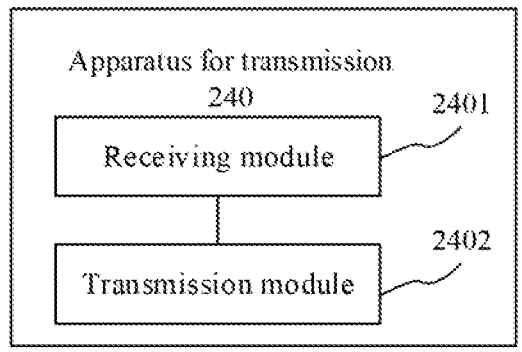
FIG. 24 is a first schematic diagram of the structure of an apparatus for transmission provided by the embodiments of the present disclosure.

The method for transmission provided by the embodiments of the present disclosure includes transmitting resource configuration information of a first SRS to a terminal device and receiving antenna ports of the first SRS resource transmitted on at least two OFDM symbols by the terminal device according to the resource configuration information. Antenna ports transmitted on each of the OFDM symbols are different. The number of antenna ports transmitted in each OFDM symbol can be reduced by dispersing different antenna ports of an SRS resource to different OFDM symbols for transmission, so that the transmission power of each antenna port can be improved, the coverage range of SRS transmission can be improved, and the performance of channel estimation can be effectively improved FIG. 24 is a first schematic diagram of the structure of an apparatus for transmission provided by the embodiments of the present disclosure. Referring to FIG. 24, the apparatus for transmission 240 may include a receiving module 2401 and a transmission module 2402.

The receiving module 2401 is configured to receive resource configuration information of a first SRS from a network device.

The transmission module 2402 is configured to transmit, according to the resource configuration information, antenna ports of the first SRS resource on at least two OFDM symbols. Antenna ports transmitted on each of the OFDM symbols are different.

In one possible embodiment, the resource configuration information includes first information. The first information is configured to indicate a number of OFDM symbols that are used for transmitting different antenna ports of the first SRS resource, or, the first information is configured to indicate that the at least two OFDM symbols are used for transmitting the different antenna ports of the first SRS resource.

In one possible embodiment, the resource configuration information includes second information, and the second information is configured to indicate a cyclic shift value of the SRS or a comb index of the SRS.

A number of OFDM symbols that are used for transmitting different antenna ports of the first SRS resource is determined according to the cyclic shift value or the comb index, or at least two OFDM symbols being used for transmitting the different antenna ports of the first SRS resource is determined according to the cyclic shift value or the comb index.

In one possible embodiment, transmitting the antenna ports of the first SRS resource on the at least two OFDM symbols includes at least one of the following operations.

Antenna ports, in the antenna ports of the first SRS resource, corresponding to the same group of polarized antennas are transmitted in the same OFDM symbol.

Coherent antenna ports in the antenna ports of the first SRS resource are transmitted in the same OFDM symbol.

When the at least two OFDM symbols are two OFDM symbols and a number of the antenna ports of the SRS resource is 4, antenna port 0 and antenna port 2 are transmitted on one of the OFDM symbols and antenna port 1 and antenna port 3 are transmitted on the other OFDM symbol.

When the at least two OFDM symbols are two OFDM symbols and the number of the antenna ports of the SRS resource is 8, antenna port 0, antenna port 2, antenna port 4 and antenna port 6 are transmitted on one of the OFDM symbols, and antenna port 1, antenna port 3, antenna port 5 and antenna port 7 are transmitted on the other OFDM symbol.

When the at least two OFDM symbols are two OFDM symbols and the number of the antenna ports of the SRS resource is 8, antenna port 0, antenna port 1, antenna port 4 and antenna port 5 are transmitted on one of the OFDM symbols, and antenna port 2, antenna port 3, antenna port 6 and antenna port 7 are transmitted on the other OFDM symbol.

When the at least two OFDM symbols are four OFDM symbols and the number of the antenna ports of the SRS resource is 8, antenna port 0 and antenna port 4 are transmitted on a first OFDM symbol, antenna port 1 and antenna port 5 are transmitted on a second OFDM symbol, antenna port 2 and antenna port 6 are transmitted on a third OFDM symbol, and antenna port 3 and antenna port 7 are transmitted on a fourth OFDM symbol. The first OFDM symbol, the second OFDM symbol, the third OFDM symbol and the fourth OFDM symbol are four different OFDM symbols among the four OFDM symbols.

In one possible embodiment, a number of the antenna ports that are transmitted on each of the at least two OFDM symbols is indicated by the resource configuration information.

Alternatively, the number of the antenna ports that are transmitted on the each of the at least two OFDM symbols is predetermined by a terminal device and the network device.

In one possible embodiment, the transmission module 2402 is specifically configured to determine a transmission power for transmitting each of the antenna ports according to a number of antenna ports transmitted on each of the at least two OFDM symbols and/or the number of the at least two OFDM symbols and transmit, according to the transmission power, the antenna ports of the first SRS resource on the at least two OFDM symbols.

In one possible embodiment, the SRS resource is configured with repetition, and the at least two OFDM symbols are basic units of the repetition.

In one possible embodiment, the SRS resource is configured with frequency hopping, and the at least two OFDM symbols are basic units of the frequency hopping.

In one possible embodiment, a first parameter of the antenna ports transmitted on each of the at least two OFDM symbols is the same, and the first parameter comprises at least one of a frequency domain resource, a transmission beam, or a transmission power.

In one possible embodiment, cyclic shift values of antenna ports transmitted on different OFDM symbols in the at least two OFDM symbols are different.

In one possible embodiment, when a total number of cyclic shift values is 12 and a number of the at least two OFDM symbols is 2, cyclic shift values used by antenna ports transmitted on one OFDM symbol is a first combination and cyclic shift values used by antenna ports transmitted on the other OFDM symbol is a second combination. The first combination and the second combination are any two of following combinations: {0, 3, 6, 9}, {1, 4, 7, 10}, or {2, 5, 8, 11}

In one possible embodiment, when a total number of cyclic shift values is 8 and a number of the at least two OFDM symbols is 2, cyclic shift values used by antenna ports transmitted on one OFDM symbol is {0, 2, 4, 6} and cyclic shift values used by antenna ports transmitted on the other OFDM symbol is {1, 3, 5, 7}.

In one possible embodiment, when a first OFDM symbol in the at least two OFDM symbols is not available for uplink transmission, the transmission module 2402 is specifically configured to not transmit the antenna ports of the first SRS resource, or only transmit antenna ports on an OFDM symbol available for the uplink transmission, or transmit antenna ports of the first OFDM symbol in a latest OFDM symbol available for the uplink transmission after the first OFDM symbol.

The first OFDM symbol is a part of the at least two OFDM symbols.

In a possible embodiment, when a second OFDM symbol in the at least two OFDM symbols is in conflict with other uplink signals and a priority of the conflicted uplink signals being higher than a priority of the SRS, the transmission module 2402 is specifically configured to not transmit antenna ports of the first SRS resource, or only transmit antenna ports on OFDM symbols that no signal collision exists, or transmit antenna ports of the second OFDM symbol in a latest OFDM symbol that no signal collision exists after the second OFDM symbol.

The second OFDM symbol is a part of the at least two OFDM symbols.

In one possible embodiment, the at least two OFDM symbols are two OFDM symbols.

Alternatively, the at least two OFDM symbols are four OFDM symbols.

In one possible embodiment, the at least two OFDM symbols are consecutive OFDM symbols.

The apparatus for transmission provided by the embodiment of the present disclosure can execute the technical solutions illustrated in the above method embodiments, and its realization principle and beneficial effect are similar, so it will not be repeated here.

Figure 25:
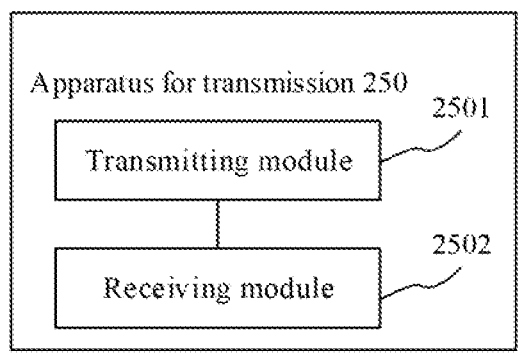
FIG. 25 is a second schematic diagram of the structure of an apparatus for transmission provided by the embodiments of the present disclosure.

FIG. 25 is the second schematic diagram of the structure of the apparatus for transmission provided by the embodiments of the present disclosure. Referring to FIG. 15, the apparatus for transmission 150 may include a transmitting module 2501 and a receiving module 2502.

The transmitting module 2501 is configured to transmit resource configuration information of a first SRS to a terminal device.

The receiving module 2502 is configured to receive antenna ports of the first SRS resource transmitted on at least two OFDM symbols by the terminal device according to the resource configuration information. Antenna ports transmitted on each of the OFDM symbols are different.

In one possible embodiment, the resource configuration information includes first information. The first information is configured to indicate a number of OFDM symbols that are used for transmitting different antenna ports of the first SRS resource, or, the first information is configured to indicate that the at least two OFDM symbols are used for transmitting the different antenna ports of the first SRS resource.

In one possible embodiment, the resource configuration information includes second information, and the second information is configured to indicate a cyclic shift value or a comb index of the SRS.

A number of OFDM symbols that are used for transmitting different antenna ports of the first SRS resource is indicated according to the cyclic shift value or the comb index, or at least two OFDM symbols being used for transmitting the different antenna ports of the first SRS resource is indicated according to the cyclic shift value or the comb index.

In one possible embodiment, transmitting the antenna ports of the first SRS resource on the at least two OFDM symbols includes at least one of the following operations.

Antenna ports, in the antenna ports of the first SRS resource, corresponding to the same group of polarized antennas are transmitted in the same OFDM symbol.

Coherent antenna ports in the antenna ports of the first SRS resource are transmitted in the same OFDM symbol.

When the at least two OFDM symbols are two OFDM symbols and a number of the antenna ports of the SRS resource is 4, antenna port 0 and antenna port 2 are transmitted on one of the OFDM symbols and antenna port 1 and antenna port 3 are transmitted on the other OFDM symbol.

When the at least two OFDM symbols are two OFDM symbols and the number of the antenna ports of the SRS resource is 8, antenna port 0, antenna port 2, antenna port 4 and antenna port 6 are transmitted on one of the OFDM symbols, and antenna port 1, antenna port 3, antenna port 5 and antenna port 7 are transmitted on the other OFDM symbol.

When the at least two OFDM symbols are two OFDM symbols and the number of the antenna ports of the SRS resource is 8, antenna port 0, antenna port 1, antenna port 4 and antenna port 5 are transmitted on one of the OFDM symbols, and antenna port 2, antenna port 3, antenna port 6 and antenna port 7 are transmitted on the other OFDM symbol.

When the at least two OFDM symbols are four OFDM symbols and the number of the antenna ports of the SRS resource is 8, antenna port 0 and antenna port 4 are transmitted on a first OFDM symbol, antenna port 1 and antenna port 5 are transmitted on a second OFDM symbol, antenna port 2 and antenna port 6 are transmitted on a third OFDM symbol, and antenna port 3 and antenna port 7 are transmitted on a fourth OFDM symbol. The first OFDM symbol, the second OFDM symbol, the third OFDM symbol and the fourth OFDM symbol are four different OFDM symbols among the four OFDM symbols.

In one possible embodiment, the number of the antenna ports that are transmitted on each of the at least two OFDM symbols is indicated by the resource configuration information.

Alternatively, the number of the antenna ports that are transmitted on the each of the at least two OFDM symbols is predetermined by the terminal device and a network device.

In one possible embodiment, a transmit power for each of the antenna ports that are transmitted on each of the at least two OFDM symbols is determined according to a number of antenna ports transmitted on each of the at least two OFDM symbols and/or the number of the at least two OFDM symbols.

In one possible embodiment, the SRS resource is configured with repetition, and the at least two OFDM symbols are basic units of repetition.

In one possible embodiment, the SRS resource is configured with frequency hopping, and the at least two OFDM symbols are basic units of the frequency hopping.

In one possible embodiment, a first parameter of the antenna ports transmitted on each of the at least two OFDM symbols is the same, and the first parameter comprises at least one of a frequency domain resource, a transmission beam, a transmission power or a reception beam.

In one possible embodiment, cyclic shift values of antenna ports transmitted on different OFDM symbols in the at least two OFDM symbols are different.

In one possible embodiment, when a total number of cyclic shift values is 12 and the number of the at least two OFDM symbols is 2, cyclic shift values used by antenna ports transmitted on one OFDM symbol is a first combination and cyclic shift values used by antenna ports transmitted on another OFDM symbol is a second combination. The first combination and the second combination are any two of following combinations: {0, 3, 6, 9}, {1, 4, 7, 10}, or {2, 5, 8, 11}.

In one possible embodiment, when a total number of cyclic shift values is 8 and a number of the at least two OFDM symbols is 2, cyclic shift values used by antenna ports transmitted on one OFDM symbol is {0, 2, 4, 6} and cyclic shift values used by antenna ports transmitted on another OFDM symbol is {1, 3, 5, 7}.

In one possible embodiment, when a first OFDM symbol in the at least two OFDM symbols is not available for uplink transmission, the receiving module 2502 is specifically configured to receive antenna ports transmitted on OFDM symbols available for the uplink transmission by the terminal device and receive antenna ports of the first OFDM symbol transmitted by the terminal device in a latest OFDM symbol available for the uplink transmission after the first OFDM symbol.

The first OFDM symbol is a part of the at least two OFDM symbols.

In one possible embodiment, when a second OFDM symbol in the at least two OFDM symbols is in conflict with other uplink signals and a priority of the conflicted uplink signals is higher than a priority of the SRS, the receiving module 2502 is specifically configured to receive antenna ports transmitted on OFDM symbols without signal collision, or, receive antenna ports transmitted on the second OFDM symbol by the terminal device in a latest OFDM symbol that no signal collision exists after the second OFDM symbol.

The second OFDM symbol is a part of the at least two OFDM symbols.

In one possible embodiment, the at least two OFDM symbols are two OFDM symbols.

Alternatively, the at least two OFDM symbols are four OFDM symbols.

In one possible embodiment, the at least two OFDM symbols are consecutive OFDM symbols.

Figure 26:
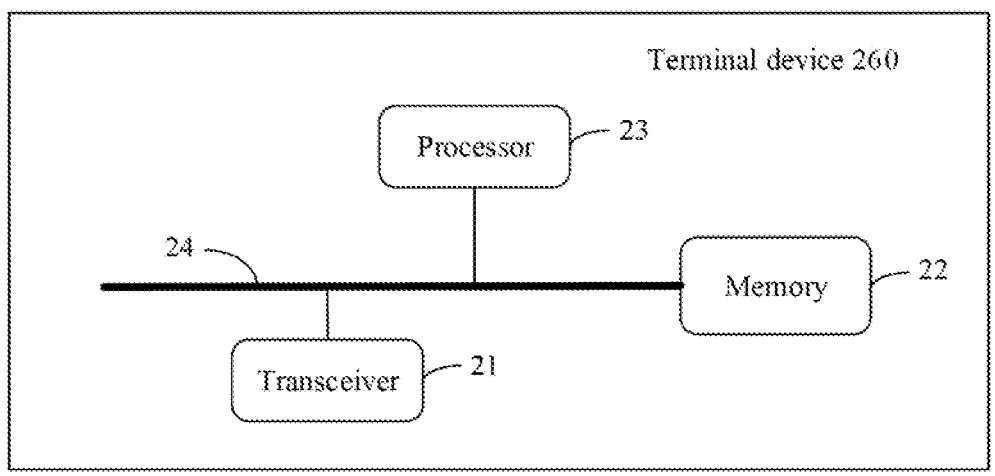
FIG. 26 is a schematic diagram of the structure of the terminal device provided by the embodiments of the present disclosure.

The apparatus for transmission provided by the embodiment of the present disclosure can execute the technical solutions illustrated in the above method embodiments, and its realization principle and beneficial effect are similar, so it will not be repeated here FIG. 26 is a schematic diagram of the structure of the terminal device provided by the embodiments of the present disclosure. Referring to FIG. 26, the terminal device 260 may include a transceiver 21, a memory 22 and a processor 23. The transceiver 21 may include a transmitter and/or a receiver. The transmitter may also be referred to as an emitter, a sender, a transmit port or a transmit interface or the like, and the receiver may also be referred to as an accepter, a receiving machine, a receive port or a receive interface or the like. Exemplarily, the transceiver 21, the memory 22, and the processor 23 are connected to each other via a bus 24.

The memory 22 is configured to store program instructions.

The processor 23 is configured to execute program instructions stored in the memory to cause the terminal device 260 to execute any of the methods for transmission shown above.

The receiver of the transceiver 21 is configured to perform the receiving function of the terminal device in the above method for transmission.

Figure 27:
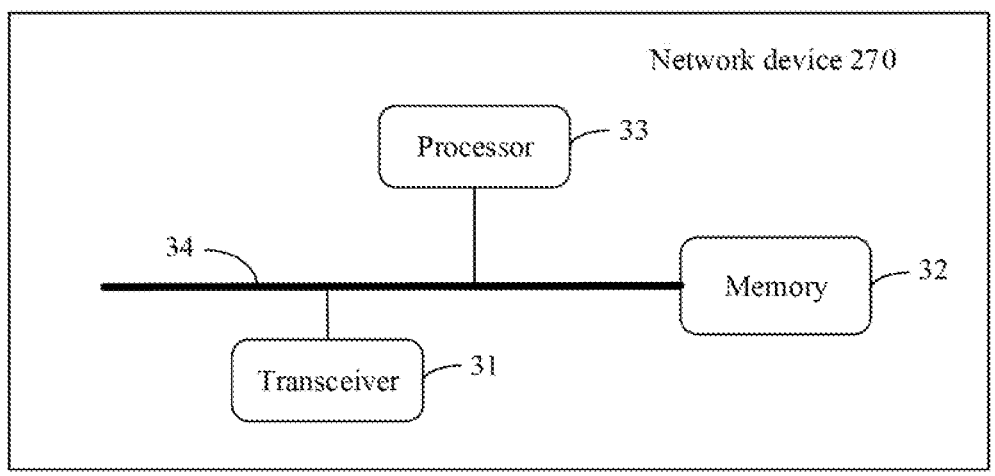
FIG. 27 is a schematic diagram of the structure of the network device provided by the embodiments of the present disclosure.

FIG. 27 is a schematic diagram of the structure of the network device provided by the embodiments of the present disclosure. Referring to FIG. 27, the network device 270 may include a transceiver 31, a memory 32 and a processor 33. The transceiver 31 may include a transmitter and/or receiver. The transmitter may also be referred to as an emitter, a sender, a transmit port or a transmit interface or the like, and the receiver may also be referred to as an accepter, a receiving machine, a receive port or a receive interface or the like. Exemplarily, the transceiver 31, the memory 32, and the processor 33 are connected to each other via a bus 34.

The memory 32 is configured to store program instructions. The processor 33 is configured to execute program instructions stored in the memory to cause the network device 270 to execute any of the methods for transmission shown above.

The receiver of the transceiver 31 is configured to perform the receiving function of the network device in the above method for transmission.

Embodiments of the present disclosure provide a computer-readable storage medium. The computer-readable storage medium stores instructions executed by a computer, and the above methods for transmission is implemented when the instructions executed by the computer are executed by a processor.

Embodiments of the present disclosure provide a computer program product, which can be executed by a processor. When the computer program product is executed, the method for transmission executed by the terminal device or the network device as described above may be implemented.

The communication device, the computer readable storage medium, and the computer program product in the embodiments of the present disclosure may execute the above method for transmission executed by the terminal device or the network device, and the specific implementation process and beneficial effects thereof are referred to above, and will not be described here.

In several embodiments provided the present disclosure, it should be understood that the disclosed systems, apparatuses and methods may be implemented in other ways. For example, the above-described embodiment of the apparatus is only schematic, for example, the division of the units is only a logical function division, and in practice, there may be another division mode, for example, multiple units or components may be combined or integrated into another system, or some features may be ignored or not performed. On the other hand, the coupling or direct coupling or communication connection between each other shown or discussed may be indirect coupling or communication connection through some interface, apparatus or unit, and may be electrical, mechanical or other form.

The elements illustrated as separate elements may or may not be physically separated, and the elements displayed as elements may or may not be physical elements, i.e. may be located in one place, or may be distributed over a plurality of network elements. Part or all of the units can be selected according to the actual requirements to achieve the purpose of the embodiment. In addition, each functional unit in each embodiment of the present disclosure may be integrated in one processing unit, each unit may exist physically alone, or two or more units may be integrated in one unit. The integrated unit can be realized either in the form of hardware or in the form of software functional unit.

Those of ordinary skill in the art will appreciate that all or part of the operations to implement the above-described method embodiments may be accomplished by program instructions associated with hardware. The computer program can be stored in a computer readable storage medium. When the computer program is executed by the processor, the operations including the above-mentioned method embodiments are implemented. The aforementioned storage medium includes various medium capable of storing program codes such as ROM, RAM, magnetic disk or optical disk.

Finally, it should be noted that the above embodiments are only used to illustrate the technical solutions of the present disclosure, not to limit the present disclosure. Although the present disclosure has been described in detail with reference to the above embodiments, it should be understood by those of ordinary skill in the art that the technical solutions described in the above embodiments can still be modified or some or all of the technical features thereof can be equivalently replaced. These modifications or substitutions do not depart the essence of the corresponding technical solutions from the scope of the technical solution of each embodiment of the present disclosure.

The invention claimed is:

1. A method for transmission, comprising:
   receiving resource configuration information of a first Sounding Reference Signal (SRS) from a network device; and
   transmitting, according to the resource configuration information, antenna ports of a first SRS resource on at least two Orthogonal Frequency Division Multiplexing (OFDM) symbols, wherein antenna ports transmitted on each of the OFDM symbols are different,
   wherein the first SRS resource is configured with repetition, and repetition is performed in a unit of the at least two OFDM symbols.

2. The method of claim 1, wherein the resource configuration information comprises first information, wherein the first information is configured to indicate a number of OFDM. symbols that are used for transmitting different antenna ports of the first SRS resource, or, the first information is configured to indicate that whether at least two OFDM symbols are used for transmitting different antenna ports of the first SRS resource.

3. The method of claim 1, wherein transmitting the antenna ports of the first SRS resource on the at least two OFDM symbols comprises:
when the at least two OFDM symbols are two OFDM symbols and a number of the antenna ports of the first SRS resource is 8, transmitting antenna port 0, antenna port 1, antenna port 4 and antenna port 5 on one of the OFDM symbols, and transmitting antenna port 2, antenna port 3, antenna port 6 and antenna port 7 on the other OFDM symbol.

4. The method of claim 1, wherein transmitting the antenna ports of the first SRS resource on the at least two OFDM symbols comprises:
determining a transmission power for transmitting each of the antenna ports according to a number of antenna ports transmitted on each of the at least two OFDM symbols and/or the number of the at least two OFDM symbols; and
transmitting, according to the transmission power, the antenna ports of the first SRS resource on the at least two OFDM symbols.

5. The method of claim 1, wherein the first SRS resource is configured with frequency hopping, and the frequency hopping is performed in a unit of the at least two OFDM symbols.

6. The method of claim 1, wherein a first parameter of the antenna ports transmitted on each of the at least two OFDM symbols is the same, and the first parameter comprises at least one of a frequency domain resource, a transmission beam, or a transmission power.

7. The method of claim 1, wherein, when a second OFDM symbol in the at least two OFDM symbols is in conflict with other uplink signals and a priority of the conflicted uplink signals is higher than a priority of the first SRS, the following operation is performed:
only transmitting, by a terminal device, antenna ports on OFDM symbols that no signal collision exists.

8. The method of claim 1, wherein
the at least two OFDM symbols are two OFDM symbols; or,
the at least two OFDM symbols are consecutive OFDM symbols.

9. A terminal device comprising:
a transceiver, a processor, and a memory;
wherein the memory stores instructions executed by a computer; and
the processor executes the instructions stored in the memory to cause the processor controlling the transceiver to execute a method for transmission comprising:
receiving resource configuration information of a first Sounding Reference Signal (SRS) from a network device; and
transmitting, according to the resource configuration information, antenna ports of a first SRS resource on at least two Orthogonal Frequency Division Multiplexing (OFDM) symbols, wherein antenna ports transmitted on each of the OFDM symbols are different,
wherein the first SRS resource is configured with repetition, and repetition is performed in a unit of the at least two OFDM symbols.

10. The terminal device of claim 9, wherein the resource configuration information comprises first information, wherein the first information is configured to indicate a number of OFDM symbols that are used for transmitting different antenna ports of the first SRS resource, or, the first information is configured to indicate that whether at least two OFDM symbols are used for transmitting different antenna ports of the first SRS resource.

11. The terminal device of claim 10, wherein a first parameter of the antenna ports transmitted on each of the at least two OFDM symbols is the same, and the first parameter comprises at least one of a frequency domain resource, a transmission beam, or a transmission power.

12. The terminal device of claim 9, wherein transmitting the antenna ports of the first SRS resource on the at least two OFDM symbols comprises:
when the at least two OFDM symbols are two OFDM symbols and a number of the antenna ports of the first SRS resource is 8, transmitting antenna port 0, antenna port 1, antenna port 4 and antenna port 5 on one of the OFDM symbols, and transmitting antenna port 2, antenna port 3, antenna port 6 and antenna port 7 on the other OFDM symbol.

13. The terminal device of claim 9, wherein transmitting the antenna ports of the first SRS resource on the at least two OFDM symbols comprises:
determining a transmission power for transmitting each of the antenna ports according to a number of antenna ports transmitted on each of the at least two OFDM symbols and/or the number of the at least two OFDM symbols; and
transmitting, according to the transmission power, the antenna ports of the first SRS resource on the at least two OFDM symbols.

14. The terminal device of claim 9, wherein the first SRS resource is configured with frequency hopping, and the frequency hopping is performed in a unit of the at least two OFDM symbols.

15. The terminal device of claim 9, wherein, when a second OFDM symbol in the at least two OFDM symbols is in conflict with other uplink signals and a priority of the conflicted uplink signals is higher than a priority of the first SRS, the following operation is performed:
only transmitting antenna ports on OFDM symbols that no signal collision exists.

16. The terminal device of claim 9, wherein
the at least two OFDM symbols are two OFDM symbols; or,
the at least two OFDM symbols are consecutive OFDM symbols.

17. A network device comprising:
a transceiver, a processor, and a memory;
wherein the memory stores instructions executed by a computer; and
the processor executes the instructions stored in the memory to cause the processor controlling the transceiver to execute a method for transmission comprising:
transmitting resource configuration information of a first Sounding Reference Signal (SRS) to a terminal device; and
receiving antenna ports of a first SRS resource transmitted on at least two Orthogonal Frequency Division Multiplexing (OFDM) symbols by the terminal device according to the resource configuration information, wherein antenna ports transmitted on each of the OFDM symbols are different, wherein the first SRS resource is configured with repetition and repetition is performed in a unit of the at least two OFDM symbols.

18. The network device of claim 17, wherein the resource configuration information comprises first information, wherein the first information is configured to indicate a number of OFDM symbols that are used for transmitting different antenna ports of the first SRS resource, or, the first information is configured to indicate that whether at least two OFDM symbols are used for transmitting different antenna ports of the first SRS resource.

19. The network device of claim 17, wherein a first parameter of the antenna ports transmitted on each of the at least two OFDM symbols is the same, and the first parameter comprises at least one of a frequency domain resource, a transmission beam, or a transmission power.

20. The network device of claim 17, wherein
the at least two OFDM symbols are two OFDM symbols; or,
the at least two OFDM symbols are consecutive OFDM symbols.

* * * * *